United States Patent [19]
Krishna

[11] Patent Number: 5,412,804
[45] Date of Patent: May 2, 1995

[54] EXTENDING THE SEMANTICS OF THE OUTER JOIN OPERATOR FOR UN-NESTING QUERIES TO A DATA BASE

[75] Inventor: Murali M. Krishna, Colorado Springs, Colo.

[73] Assignee: Oracle Corporation, Redwood City, Calif.

[21] Appl. No.: 876,393

[22] Filed: Apr. 30, 1992

[51] Int. Cl.⁶ .............................................. G06F 15/40
[52] U.S. Cl. ............................ 395/600; 364/DIG. 1; 364/282.1; 364/283.4
[58] Field of Search ........................ 395/600, 700, 425

[56] References Cited

U.S. PATENT DOCUMENTS

| | | | |
|---|---|---|---|
| 4,506,326 | 3/1985 | Shaw et al. | 395/700 |
| 4,648,044 | 3/1987 | Hardy et al. | 364/513 |
| 4,829,427 | 5/1989 | Green | 395/600 |
| 4,918,593 | 4/1990 | Huber | 395/600 |
| 4,956,774 | 9/1990 | Shibamiya et al. | 395/600 |
| 5,276,870 | 1/1994 | Shan et al. | 395/600 |

OTHER PUBLICATIONS

R. Epstein, "Techniques for Processing of Aggregates in Relational Database Systems," Memorandum No. UCB/ERL M79/8, Electronics Research Lab., UCLA, Berkeley, Calif. 21 Feb. 1979.

Hobbs and England, *Rdb/VMS—A Comprehensive Guide*, Digital Equipment Corporation, Maynard, Mass. (1991).

Arnon Rosenthal and Cesar Galindo-Legaria, "Query Graphs, Implementing Trees, and Freely-Reorderable Outerjoins," Proc. SIGMOD Conf., Association for Computing Machinery, United States (May 1990), pp. 291–299.

M. Muralikrishna, "Optimization and Dataflow Algorithms for Nested Tree Queries," Proc. VLDB Conf. (Aug. 1989), pp. 77–85.

Ganski & Wong, "Optimization of Nested SQL Queries Revisited," Proc. SIGMOD Conf., Association for Computing Machinery, United States (May 1987), pp. 22–23.

Umeshwar Dayal, "Of Nests and Trees: A Unified Approach to Processing Queries That Contain Nested Subqueries, Aggregates and Quantifiers," Proceedings of the 13 VLDB Conference, Brighton, 1987, pp. 197–208.

C. J. Date, *A Guide to The SQL Standard*, Addison-Wesley Publishing Company, Menlo Park, Calif., 1987, pp. 7–13, 82–107.

Won Kim, "On Optimizing an SQL-like Nested Query," ACM Transactions on Database Systems, vol. 9, No. 3, Association for Computing Machinery, United States, Sep. 1982, pp. 443–469.

Barr & Feigenbau, Eds., *The Handbook of Artificial Intelligence*, vol. II, William Kaufmann, Inc., Los Altos, Calif., 1982, pp. 163–173.

Astrahan & Chamberlin, "Implementation of a Structured English Query Language," Communications of the ACM, United States, vol. 18, No. 10, Oct. 1975, pp. 580–588.

*Primary Examiner*—Paul V. Kulik
*Attorney, Agent, or Firm*—Blakely, Sokoloff, Taylor & Zafman

[57] ABSTRACT

The semantics of the outer join operator are extended to permit the application of different predicates to the join tuples and the anti-join tuples. For un-nesting of nested query blocks, the anti-join tuples, for example, are associated with a count value of zero instead of a count value of null. An inner query block is un-nested from an outer query block by converting the inner query to a first un-nested query generating a temporary relation and converting the outer query block to a second un-nested query receiving the precomputed temporary relation. When the nested inner query has an equi-join predicate joining a relation of the inner query to an outer query and a count aggregate, the query blocks are un-nested by removing the equi-join predicate from the inner query and placing a corresponding conjunctive (left) outerjoin predicate term in the predicate of the outer query, performing the count aggregate for each distinct value of the joining attribute of the relation of the inner query, and in the outer query applying different predicates to the joining and anti-joining tuples such that the predicate of the anti-joining tuples is evaluated assuming a count value of zero.

20 Claims, 18 Drawing Sheets

FIG. 14
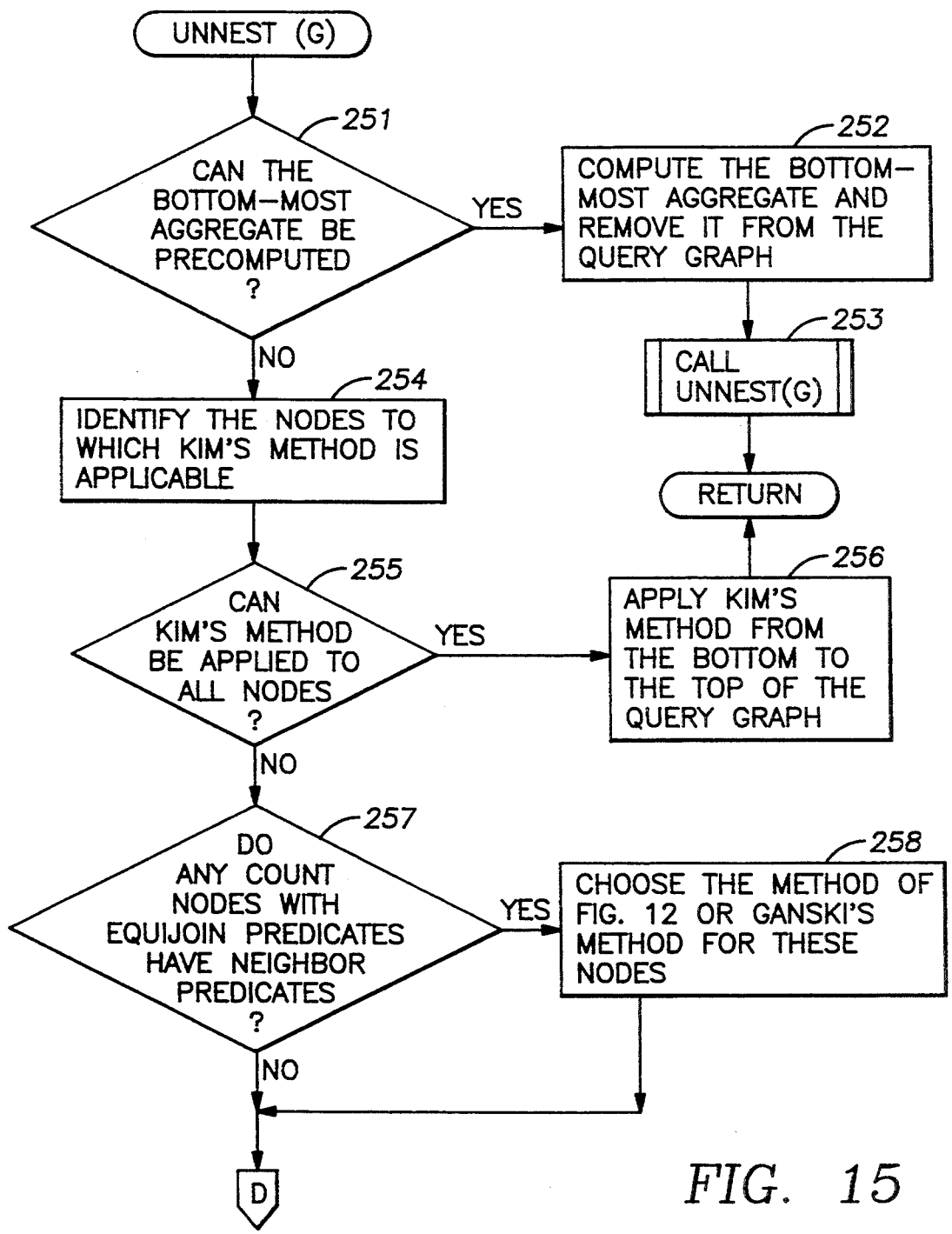
FIG. 15

EXTENDING THE SEMANTICS OF THE OUTER JOIN OPERATOR FOR UN-NESTING QUERIES TO A DATA BASE

BACKGROUND OF THE INVENTION

1. Technical Field

The present invention relates generally to database management systems, and more particularly to query optimization in a database system. The present invention specifically relates to un-nesting nested database queries by distinguishing between joining and anti-joining tuples during an outer join operation.

2. Background of the Invention

A database management system is a computer system that provides for the storage and retrieval of information about a subject domain. Typical examples are airline reservation systems, payroll systems, and inventory systems. The database management system includes an organized collection of data about the subject domain, and a data-manipulation language for querying and altering the data. Typically, the data are organized as "tuples" of respective values for predefined attributes.

In a so-called "relational" database management system, the tuples of data are stored in a plurality of tables, each of which corresponds to a set of tuples for common predefined attributes. Each table corresponds to a single "relation". Each attribute of the relation corresponds to a column of the table, and each tuple of values corresponds to a particular row of the table. Each value in the table corresponds to a particular row or tuple and a particular column or attribute. A collection of related tables or relations in the database is known as a schema.

The data manipulation language for a relational database management system typically specifies operations upon one or more relations to create a new relation. A "restriction" operation forms a subset of the rows in a table by applying a condition or "predicate" to the values in each row. A "projection" operation removes columns from the rows by forming a stream of rows with only specified columns. A "join" operation combines data from a first table with data from a second table, typically by applying a predicate comparing the values in a column of the first table to the values in a related column of the second table. Usually such a join predicate is an "equi-join" predicate in which a first function of the attribute corresponding to the column of the first table must equal a second function of the attribute corresponding to the column of the second table.

Yet another operation upon a relation is known as an aggregation, in which a new column of values is generated by combining or aggregating values from all of the rows, or specified groups of rows. Aggregate functions include, for example, a count of the rows in each group, or the sum of the values of a specified attribute for all rows in each group. Typically, the rows are grouped for aggregation such that the rows in each group have equal values for a specified column or attribute. Therefore, a new aggregate value is generated corresponding to each distinct value of the specified attribute.

The query language for a relational database system typically defines a syntax for specifying a "query block" including a list of relations to be accessed, a predicate to govern restriction or join operations, a list of attributes to specify a projection operation, and a list of aggregate functions. If at least one attribute is specified and at least one aggregate function is also specified, then a meaningful result usually would require the aggregate to be grouped for each distinct value of the specified attribute. Although such a grouping could be presumed, the query language may permit or require grouping in this situation to be specified by a list of grouping attributes. In this case, the rows are grouped prior to aggregation such that each group corresponds to each distinct combination of values for all of the specified grouping attributes.

Some query languages permit query blocks to be nested such that the predicate of an "outer" query block includes reference to the result of an "inner" query block. In this case, the query language specifies a result that would be obtained by re-evaluating the inner query block each time the outer query block evaluates the predicate for a different row or combination of rows when performing its specified restriction or join operations. Evaluating the result in such a fashion, however, usually is very inefficient.

To select the most efficient of alternative ways of evaluating a query, the database management system typically includes a query optimizer. In general, a query can be evaluated a number of ways, because, in many cases, the query operations obey certain commutative, associative, or distributive laws. By applying these laws, the query optimizer may formulate alternative orders of performing the query operations, compute a cost of performing each such "query plan", and select the least costly query plan for execution.

Unfortunately, if a query is specified by nested query blocks, the nesting itself specifies an iterative order of performing query operations. Since the query operations of an inner block are specified to occur during the restriction or join operation of the outer query block, the query optimizer cannot apply the laws permitting alternative execution orders unless the nested query blocks are first "un-nested" into equivalent "pipelined" query blocks.

When query blocks are pipelined, the result of a first query block is specified as input to the predicate of a second query block, but that result is presumed to be evaluated only once before evaluation of the second query block. Therefore, there is a distinct order of performance specified between the first query block and the second query block. In many cases the un-nesting process generates un-nested query blocks in which this specified order is more efficient that the iterative method of executing the original nested query blocks. In other cases, the optimizer can find an even better order of execution for evaluating the un-nested query blocks.

The problem of un-nesting and optimizing database queries has been studied extensively. A general solution was proposed in Won Kim, "On Optimizing an SQL-like Nested Query", ACM Transactions on Database Systems, Vol. 9, No. 3, American Association for Computing Machinery, United States (1982), incorporated herein by reference. Later, it was discovered that the un-nesting technique of Kim does not always yield the correct results for nested queries that have non equi-join correlation predicates or that have a "COUNT" aggregate between the nested blocks. Un-nesting solutions for these anomalous cases were described in Richard A. Ganski and Harry K. T. Wong, "Optimization of Nested SQL Queries Revisited", Proceedings of the Sigmod Conference, American Association for Computing Machinery, United States (1987), pp. 23-33, incorporated herein by reference. Ganski's method of un-nesting was extended to multiple nested blocks as disclosed in Umeshwar Dayal, "Of Nests and Trees: A Unified Approach to Processing Queries That Contain Nested Subqueries, Aggregates and Quantifiers", Proceedings of the 13 VLDB Conference, Brighton, 1987, pp. 197–208, incorporated herein by reference. Methods of un-nesting multiple blocks within the same block are disclosed in M. Muralikrishna, "Optimization and Dataflow Algorithms for Nested Tree Queries", Proc. VLDB Conf. (August 1989), pp. 77–85, incorporated herein by reference. The commuting of joins and outer joins under specific conditions is disclosed in Arnon Rosenthal and Cesar Galindo-Legaria, "Query Graphs, Implementing Trees, and Freely-Reorderable Outerjoins", Proc. SIGMOD Conf (May 1990), pp. 291–299, incorporated herein by reference.

SUMMARY OF THE INVENTION

Briefly, in accordance with the present invention, there is provided an alternative method of un-nesting queries with equi-join predicates and a "COUNT" aggregate between the nested blocks. This alternative is used where it is more efficient, than the method of Ganski, supra. The method of the present invention extends the semantics of the outer join operator to permit the application of different predicates to the join tuples and the anti-join tuples. The anti-join tuples, for example, are associated with a count value of zero.

A further aspect of the present invention involves the use of the novel un-nesting method to queries with multiple blocks. In this case, the alternative un-nesting method of the present invention is used when the correlation predicates in the Count block are "neighbor predicate" referencing the relation in their own block and the relation from the immediately enclosing block. Otherwise, the Ganski-Dayal un-nesting method is used.

Still another aspect of the present invention is an integrated procedure for evaluating joins and outer-joins in a top-down order. This integrated procedure enables the alternative un-nesting method of the present invention to be applied to more blocks.

BRIEF DESCRIPTION OF THE DRAWINGS

Other objects and advantages of the invention will become apparent upon reading the following detailed description and upon reference to the drawings in which:

FIG. 14 is a join graph used by the query optimizer of the present invention;

FIGS. 15 and 16 together comprise a flowchart of an integrated un-nesting procedure in accordance with the present invention;

Figure 1:
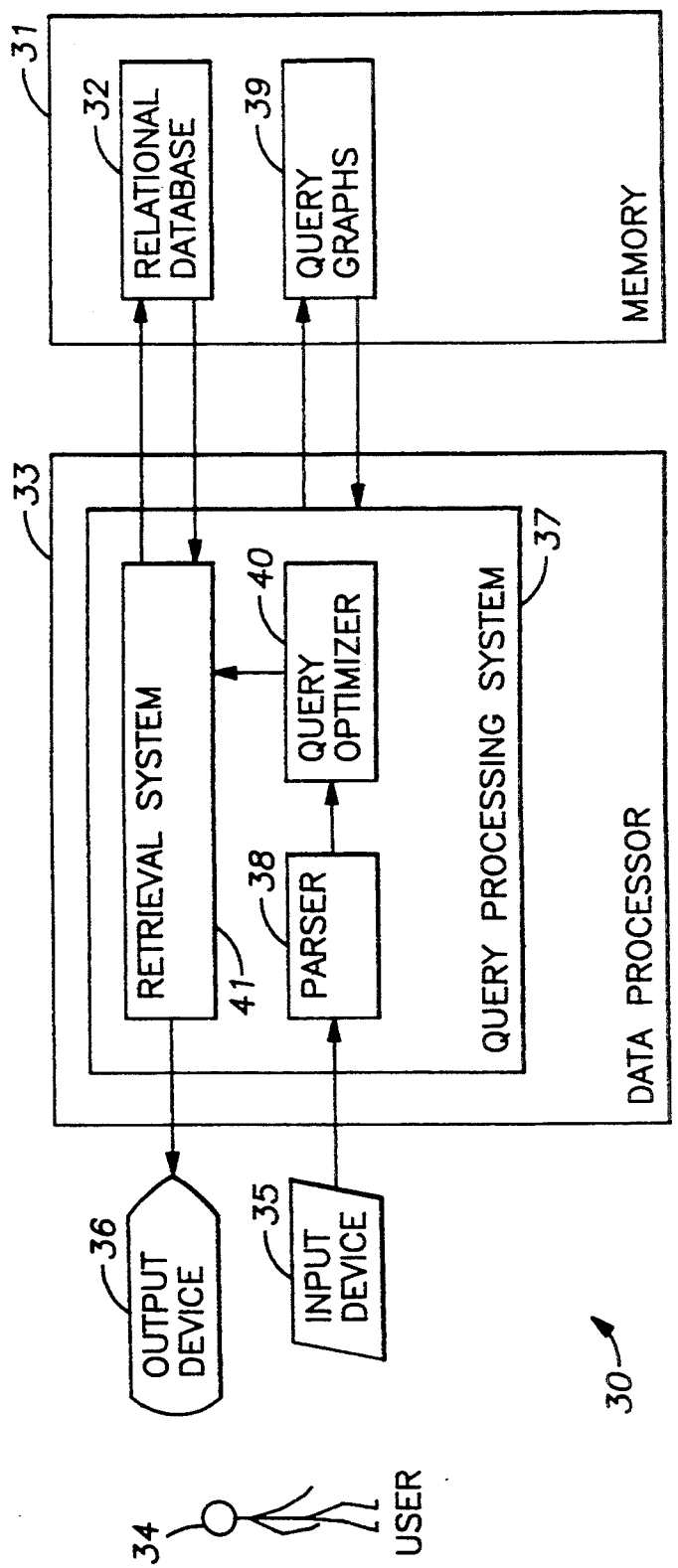
FIG. 1 is a block diagram of a database management system incorporating the present invention.

While the invention is susceptible to various modifications and alternative forms, a specific embodiment thereof has been shown by way of example in the drawings and will herein be described in detail. It should be understood, however, that it is not intended to limit the invention to the particular form disclosed, but, on the contrary, the intention is to cover all modifications, equivalents, and alternatives falling within the spirit and scope of the invention as defined by the appended claims.

DETAILED DESCRIPTION OF THE PREFERRED EMBODIMENT

Turning now to FIG. 1 of the drawings, there is shown a database management system generally designated 30. The database management system 30 is made by programming a conventional digital computer. The database management system 30 includes a memory 31 storing a relational data-base 32, as will be further described below with reference to FIG. 2. For processing data in the relational data-base 32, the database management system 30 includes a data processor 33. For communicating with a user 34, the database management system includes an input device 35, such as a keyboard, and an output device 36, such as a video display.

The present invention more particularly concerns the processing of a query from the user 34 instructing the database management system 30 to display to the user specified data from the relational database 32. The query is received by the input device 35 and processed by a query processing system 37 in the data processor 33. In particular, the query processing system is made by loading a computer program into the data processor 33 and executing that computer program. The query processing system 37 includes a parser 38 which converts the query from the user 34 into an internal representation that identifies and locates specific components of the query. The internal representation, for example, is a hierarchical graph constituting one of the query graphs 39 stored in the memory 31.

The query graph of the parsed query specifies a particular order of execution, but the specified order of execution is not necessarily the optimum way of executing the query. Instead, there may be any number of better alternative ways of executing the query to obtain identical results. To possibly obtain a more optimum execution plan, the query processing system 37 includes a query optimizer 40 that operates upon the query graph of the parsed query to generate a number of alternative query plans, each specified by a respective one of the query graphs 39. The query optimizer 40 computes a cost associated with each of the alternative query plans, and executes the query plan having the least cost. During execution of this query plan, a retrieval system 41 accessing data from the relation database 32, and performs upon the data a number of relational operations. These relational operations result in an output relation which is transmitted to the output device 36 and displayed to the user 34.

Figure 2:
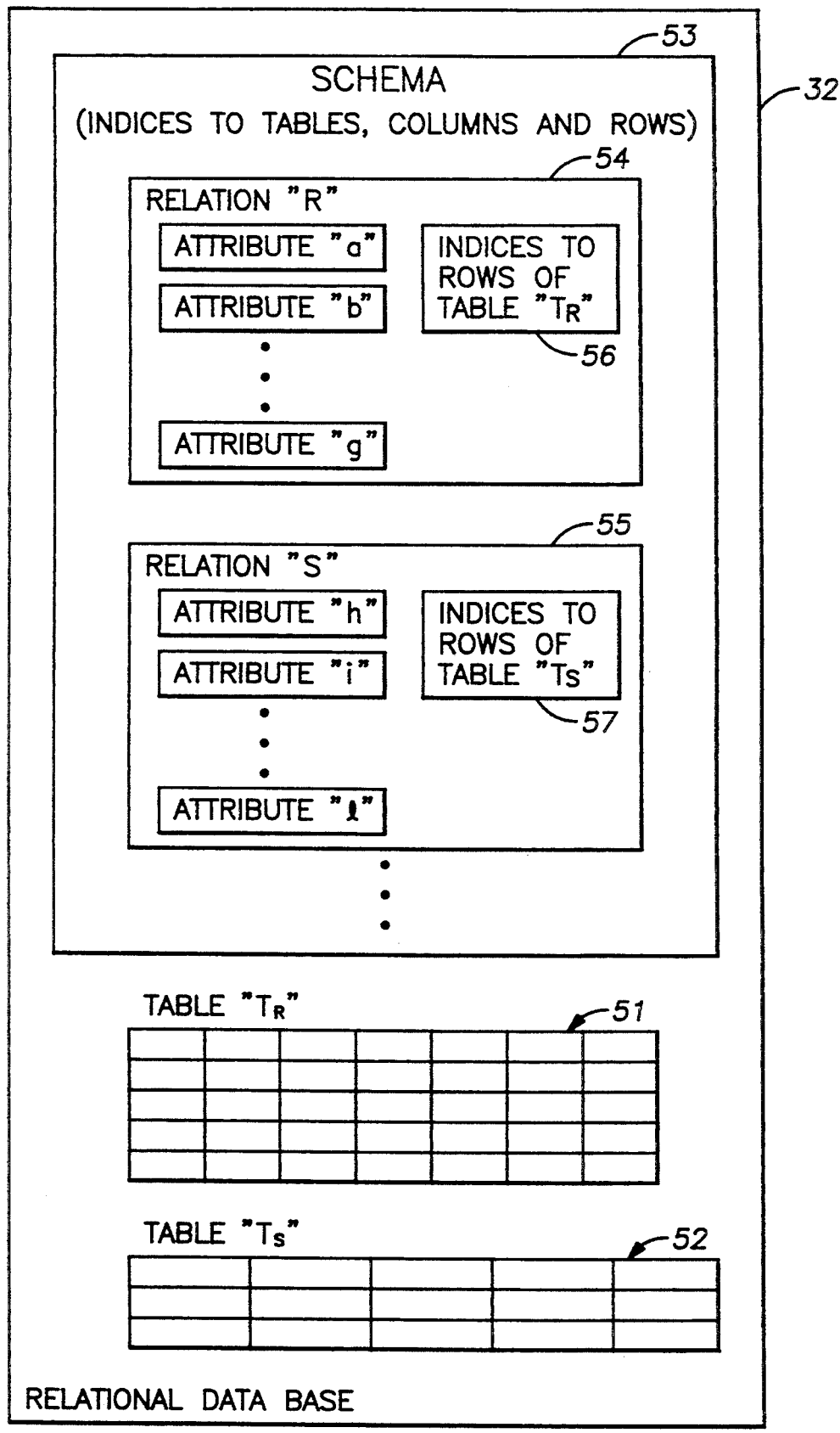
FIG. 2 is a block diagram of a relational database used in the database management system of FIG. 1.

Turning now to FIG. 2, there is shown a detailed representation of the relational database 32. The relational database 32 includes data stored in a number of tables, such as the tables 51 and 52. Each table corresponds to a particular relation in the relational database. The table 51, for example, corresponds to a relation "R" and the table 52 corresponds to a relation "S". Each table is shown as a rectangular matrix of rows and columns. Internally, however, the data could be stored in any number of ways. Each row, for example, could be stored as a record of a file. Alternatively, the data in each of the tables could be freely dispersed in memory, and the rows and columns could be defined by lists of pointers to the data. In any event, the data structures storing the data in the tables 51 and 52 permit all of the rows in a table to be accessed sequentially and further permit a specified column position of an accessed row to be indexed.

Each column in each of the tables is indexed by a key called an attribute. Most conventional database query languages assign an alphanumeric relation name to each table and further assign an alphanumeric attribute name to each column of each table, but the attribute name associated with one table need not be distinct from the attribute name of another table. A particular column of data, however, can be uniquely specified by the combination or concatenation of both a relation name and an attribute name.

To index the columns of the tables, the relational database 32 further includes a number of indices, or definitions of keys, to the tables and columns. These indices are known as a schema 53 corresponding to a particular subject domain. The schema 53 is further subdivided into an index for each relation, such as an index 54 to the relation "R" of the first table 51, and an index 55 to the relation "S" for the second table 52. The index 54 to the relation "R" includes a name ("R") for the relation and a name ("a", "b", "c", "d", "e", "f", "g") for each attribute corresponding to each column of the table R, and the index 55 to the relation "S" includes a name ("S") for the relation and a name ("h", "i", "j", "k", "l") for each attribute corresponding to each column of the table 52. The indices 54 and 55, for example, permit a numerical pointer or address to be obtained to a table and column specified by a relation name and an attribute name.

The indices 54 and 55 may further include respective indices 56 and 57 to the individual rows of the tables. For processing most relational operations, it is only necessary to scan sequentially through all of the rows of a table. To facilitate the selection and retrieval of a particular row, however, it is desirable to identify one or more columns of the table as including keys to the individual rows. Some operating systems, for example, have optimized procedures for storing tables in files according to a primary key and for retrieving a row or record specified by the primary key. In such systems, if the user does not specify a column as including the primary key, the system may nevertheless assign a primary key to each row. In such a case, the primary key is known as a "surrogate column" which, if not accessible to the user, will be accessible to the computer programmer.

Figure 3:
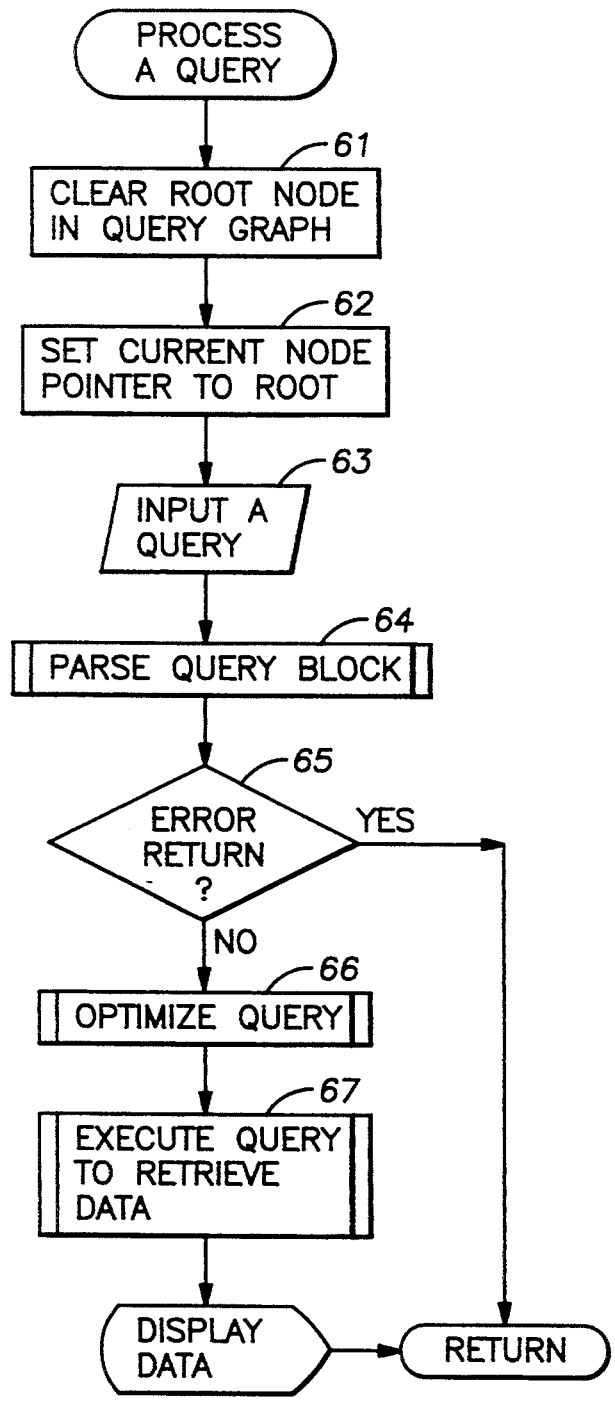
FIG. 3 is a flowchart of the basic steps followed by the database management system of FIG. 1 for processing a query.

Turning now to FIG. 3, there is shown a flowchart of the basic procedure followed by the query processing system (37 in FIG. 1) when processing a query. In a first step 61, a root node is cleared for a query graph to receive a query from the user 34. Next, in step 62, a current node pointer is set to point to the root node. Then, in step 63, a query is received from the user 34.

The query is a string of alphanumeric characters which conform to a query language that identifies data in the relational database and operations to perform upon the data. In many conventional query languages, the query is in the form of a query block, which may refer to additional nested query blocks, as will be further described below.

To process the query, the query is converted or parsed from the variable-length format of the query language into a more fixed format for processing by the query optimizer (40 in FIG. 1) and execution by the retrieval system (41 in FIG. 1). The query block is parsed in step 64, for example, by calling a subroutine further described below with reference to FIG. 5. Parsing of the query block generates a node in the query graph. If the parsed query block includes nested nodes, the nested nodes are parsed recursively, creating additional nodes in the query graph that are linked to the root node. Once the query block is parsed, execution continues from step 64 to step 65.

If the query from the user fails to conform to the syntax of the query language, the parsing in step 64 will return with an error. If so, then further processing of the query cannot continue, and execution therefore returns, so that the user may submit a corrected query. Otherwise, execution continues in step 66 by optimizing the query.

Query optimization is further described below with reference to FIGS. 9 to 22. The query optimization results in a number of alternative query plans represented by respective query graphs (39 in FIG. 1). The optimizer (40 in FIG. 1) selects the query plan having the least computational cost, and, in step 67, that query plan is executed. The query plans includes nodes, each of which corresponds to the operations of a single query block. The execution of a single query block is further described below with reference to FIGS. 7, 8 and 13.

For the sake of illustration, the syntax for a specific query language will now be described. This syntax will roughly correspond to "Structured Query Language" (SQL) as adopted by the American National Standards Institute in 1986. The use of such a standard query language in the context of a relational database system is described in Hobbs and England, *Rdb/VMS—A Comprehensive Guide*, Digital Equipment Corporation, Maynard, Mass. (1991), incorporated by reference, on pages 36–64.

It is possible to represent virtually any query by a pipelined series of query blocks, each of which specifies a list of relations, a predicate for restricting or joining rows of the relations, a list of columns to be selected as output, and a list of aggregate functions. If at least one column and at least one aggregate function is specified, it is also desirable to specify groups of rows over which the aggregate functions are to be performed. Typically, it is desirable to group rows having identical values in specified columns. Therefore, regardless of the particular syntax of the query language, virtually any query to a relational database can be represented as a graph of nodes having a format similar to the format shown in FIG. 4.

Figure 4:
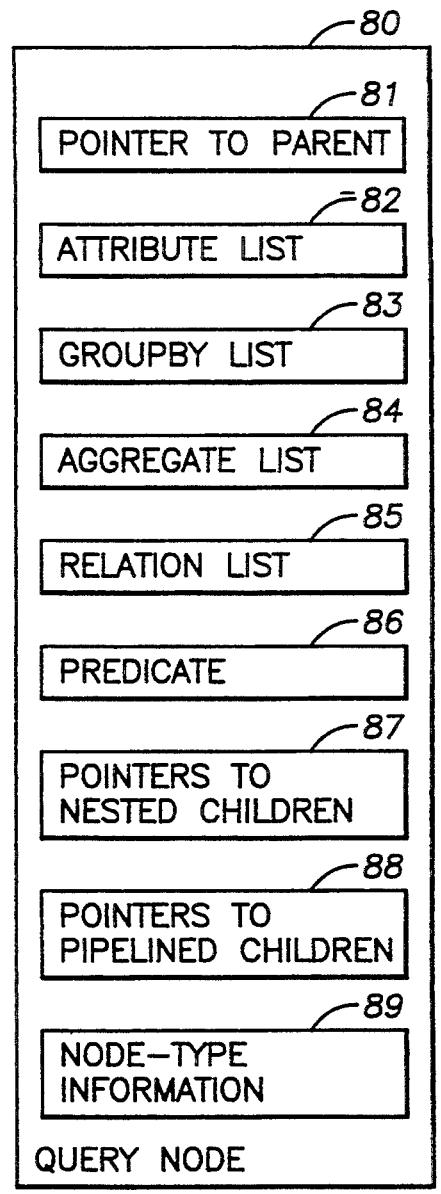
FIG. 4 is a block diagram of a query node generated during the parsing of a query block by the database management system.

As shown in FIG. 4, a query node 80 includes a pointer 81 to its parent node in the query graph, an attribute list 82 specifying the columns in an output relation, a "GROUPBY" list 83 specifying the columns for grouping rows having identical values in the columns, an aggregate list 84 of the aggregate functions to perform upon the grouped rows, a relation list 85 specifying the input to the query node, a predicate 86 to be tested against combinations of rows of the input relations, pointers 87 to nested children of the query node 80, and pointers 88 to pipelined children of the query node 80.

The hierarchical structure of a query graph including the query node 80 specifies an order of execution among the query nodes. According to the specified order, the root node of the query graph is first inspected to determine whether it has any pointers to pipelined children. If so, then the pipelined children nodes are inspected in a recursive fashion until a node is found having no pipelined children. This so-called "leaf" node in the query graph is executed, which may require the execution of nested query blocks specified by the pointers to the nested children. Once execution of a query node is completed, execution returns to its parent node. In this way, the specified order of execution is from the bottom of the query graph to the top of the query graph. Once the root query node is executed, the resulting relation is transmitted as output to the user.

The execution order specified by the query graph might not be the best order of execution. Therefore, when a query block is parsed, the parser (38 in FIG. 1) may identify node-type information 89 for use by the query optimizer (40 in FIG. 1). The node-type information 89, for example, specifies whether the node has an aggregate function, whether the aggregate function is a count function, whether the predicate is an equi-join predicate, whether the node is a nested node of a parent node, and whether a nested node references a relation in a parent or ancestor node in which it is nested.

For describing the parser 38, it is necessary to assume a specific format for a query from the user. A query will include, for example, a "SELECT" statement, a "FROM" statement, possibly a "WHERE" statement, and possibly a "GROUPBY" statement, arranged as follows:

SELECT [Attribute list] [Aggregate list]
FROM [Relation list]
[WHERE [Predicate ]]
[GROUPBY [Attribute list]]

When there is a "WHERE" statement having a predicate, the predicate should have two terms joined by a relational operator, and possibly one or more logical operators joining similar combinations of terms as follows:

[term] [Relation Operator] [term]

-continued

[Logical operator] [term] [Relational operator] [term]
[Logical operator] [term] [Relational operator] [term]
...

Figure 5:
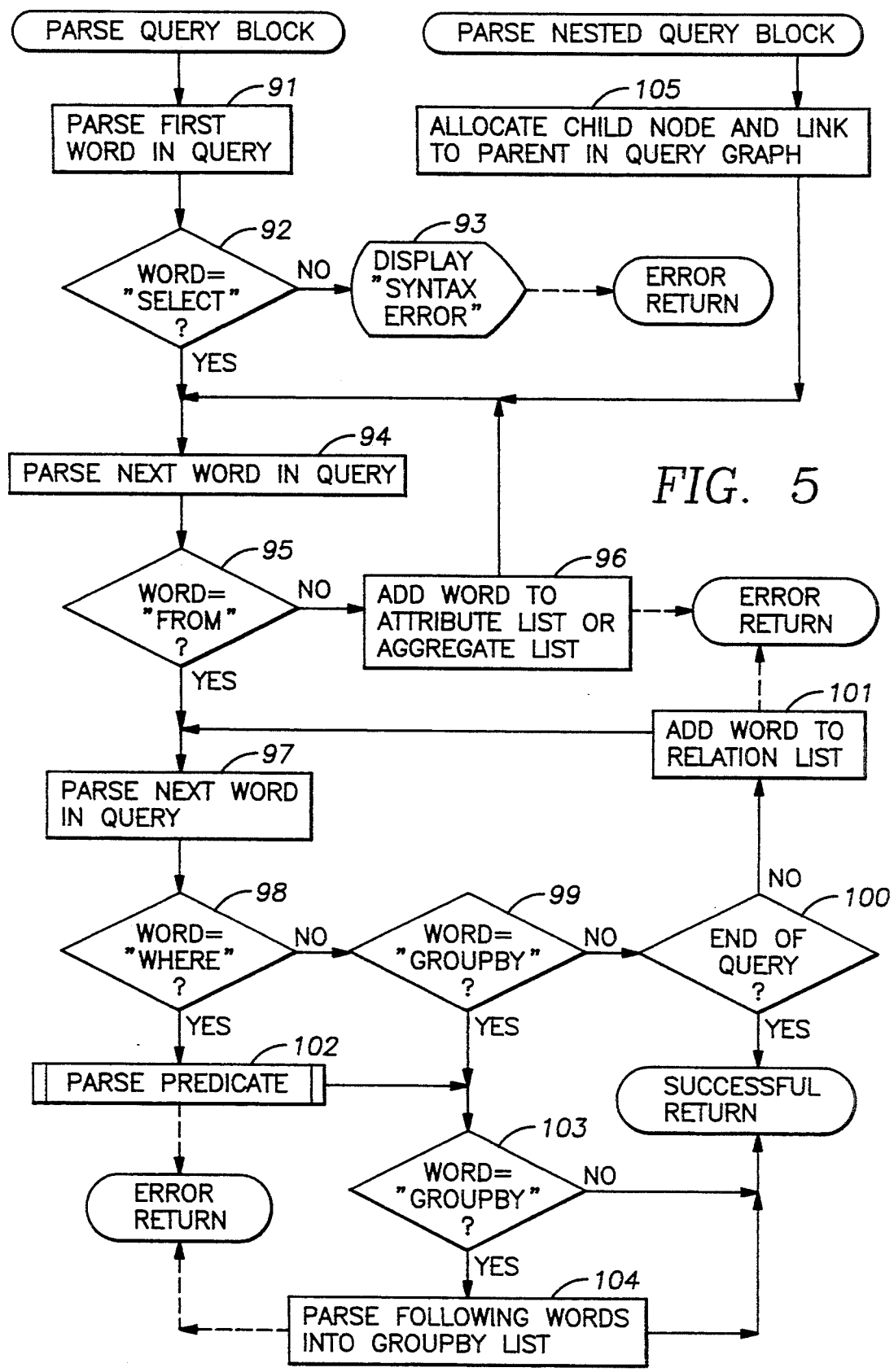
FIG. 5 is a flowchart of a procedure followed by the database management system of FIG. 1 when parsing a query block.

Turning now to FIG. 5, there is shown a flowchart of a procedure for parsing a query block having the above format. In a first step 91, a first word in the query is parsed. If the first word is not "SELECT", as tested in step 92, then a syntax error has occurred. The user is notified of the error in step 93, and execution returns. Otherwise, in step 94, the next word in the query is parsed. If the word is not "FROM", as tested in step 95, then the word should be part of the attribute list or the aggregate list. The word is compared to reserved words for predetermined aggregate functions (such as COUNT or SUM), and if the word is recognized as an aggregate, it is placed in the aggregate list. Otherwise, the word is placed in the attribute list. If the word does not correspond to an alphanumeric name for an attribute, then an error has occurred and execution returns. Otherwise, execution loops from step 96 back to step 94 to parse the next word in the query. Eventually, step 95 will recognize the word "FROM" beginning the relation list. In step 97, the next word is parsed, and in step 98, the word is compared to "WHERE". If the word is not "WHERE", then it should be a relation. Therefore, execution branches to step 99. In step 99, execution branches to step 103 if the word is "GROUPBY". Otherwise, execution continues to step 100. In step 100, execution returns if the end of the query is reached. If not, then execution continues to step 101 to add the word to the relation list of the query block. If the word does not correspond to the name of a predefined relation, however, an error has occurred, and execution returns. Otherwise, execution loops back to step 97.

If step 98 finds that the word is "WHERE", then execution continues to step 102 to parse the predicate of the "WHERE" statement. The predicate is parsed as described below in FIG. 6. After parsing the predicate, execution continues in step 103 to determine whether a "GROUPBY" statement follows the "WHERE" statement. If not, the end of the query block has been reached and execution returns. Otherwise, in step 103, the following words are parsed into the "GROUPBY" list.

The procedure of FIG. 5 is also used when parsing an inner nested query block. In this case, a step 105 is executed which allocates a child node for the nested query block, and links the child node to the parent node in the query graph. Step 105 is called when the predicate of an outer query block is parsed and the word "SELECT" is discovered as a term in the predicate, as further described below with reference to FIG. 6. After step 105, execution continues in step 94 to parse the next word in the inner nested query block.

Figure 6:
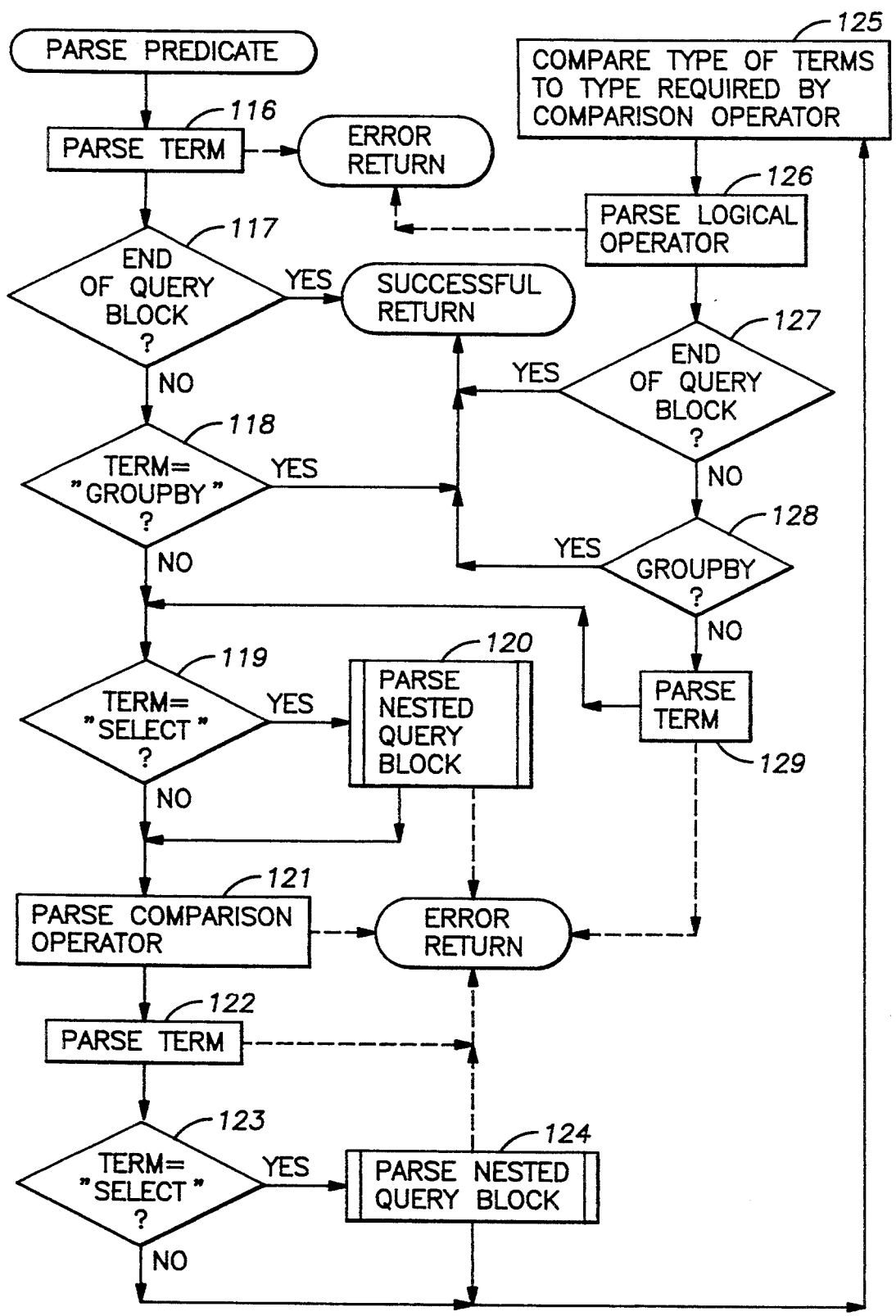
FIG. 6 is a flowchart of a procedure used by the database management system when parsing a predicate in a query block.

Turning now to FIG. 6, there is shown a flowchart of a procedure for parsing the predicate. In a first step 116, a first term of the predicate is parsed. The term should either be a constant, a predefined attribute, the end of the query block, the beginning of a GROUPBY statement, or the word "SELECT" specifying a nested query block. If the end of the query block is reached, as tested in step 117, execution returns. If the term is GROUPBY, as tested in step 118, execution also returns. If the term is "SELECT" as tested in 119, then in step 120, the procedure of FIG. 5 is called recursively to parse the nested query block. In any case, execution continues in step 121 to parse a comparison operator. If a predefined comparison operator is not found, then an error has occurred and execution returns. Otherwise, in step 122, a next term is parsed. If the term is "SELECT", as tested in step 123, then the term is a nested query block, and execution branches to step 124 to recursively call the procedure of FIG. 5 to parse the nested query block. In any case, execution continues in step 125 to compare the type of the two previous parsed terms to the type required by the comparison operator parsed in step 121. If the type of the terms do not agree with the comparison operator, then an error has occurred and execution returns. Otherwise, execution continues to step 126. Step 126 attempts to parse a logical operator. The predicate, however, might not have a logical operator. Step 127 determines whether the end of the query block has been reached. If so, execution returns. Otherwise, step 128 determines whether the beginning of a "GROUPBY" statement has been reached. If so, execution returns. Otherwise, assuming that a valid logical operator has been parsed, execution continues to step 129, where a next term is parsed. Execution then loops back to step 119. Therefore, additional terms and comparison operators are parsed until the end of the predicate is reached in step 127 or 128.

Specific programming for parsing expressions and evaluating expressions by symbolic execution is found in Hardy et al., U.S. Pat. No. 4,648,044, issued Mar. 3, 1987, incorporated herein by reference.

Figure 7:
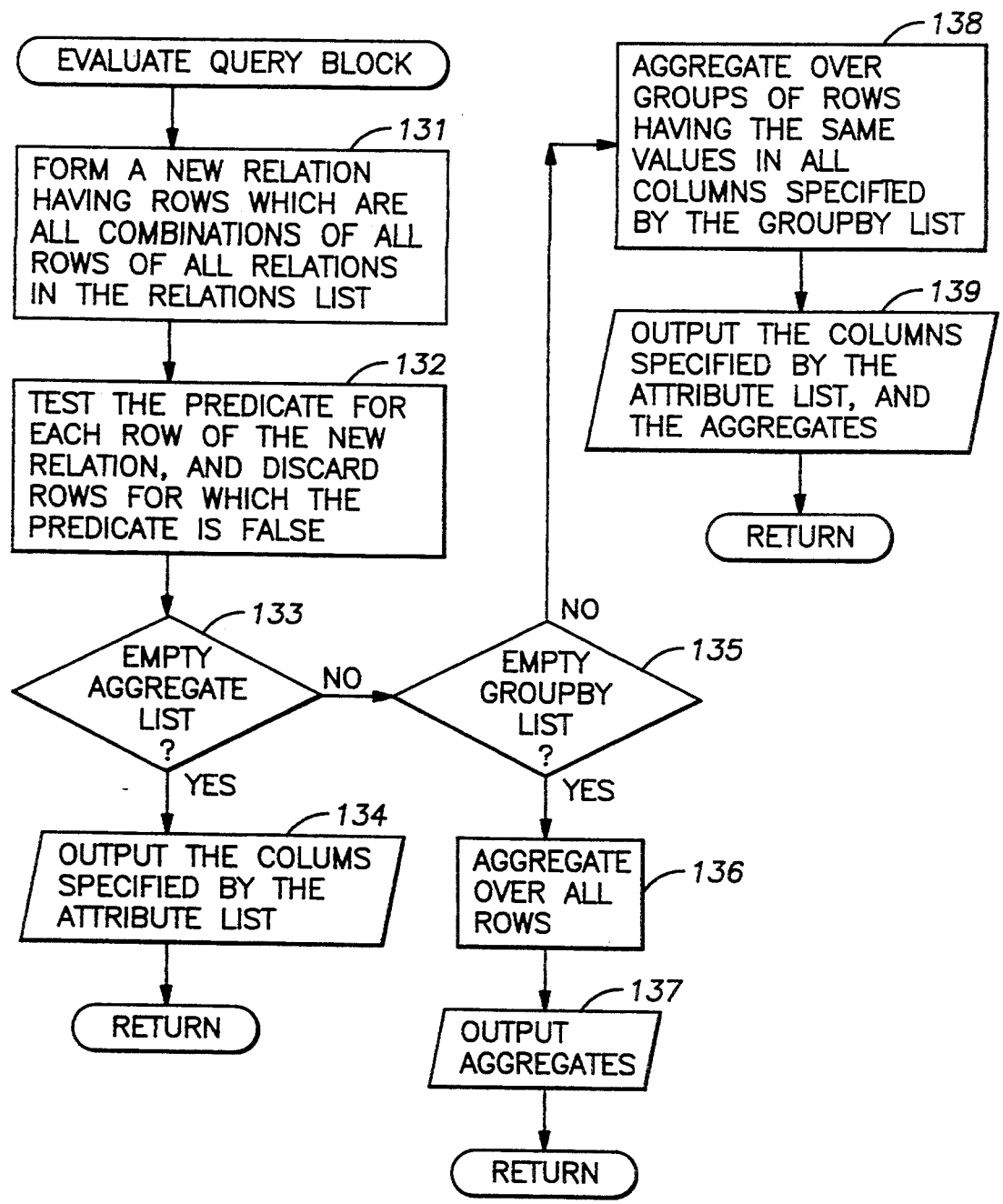
FIG. 7 is a flowchart of a procedure for executing a query block.
Figure 13:
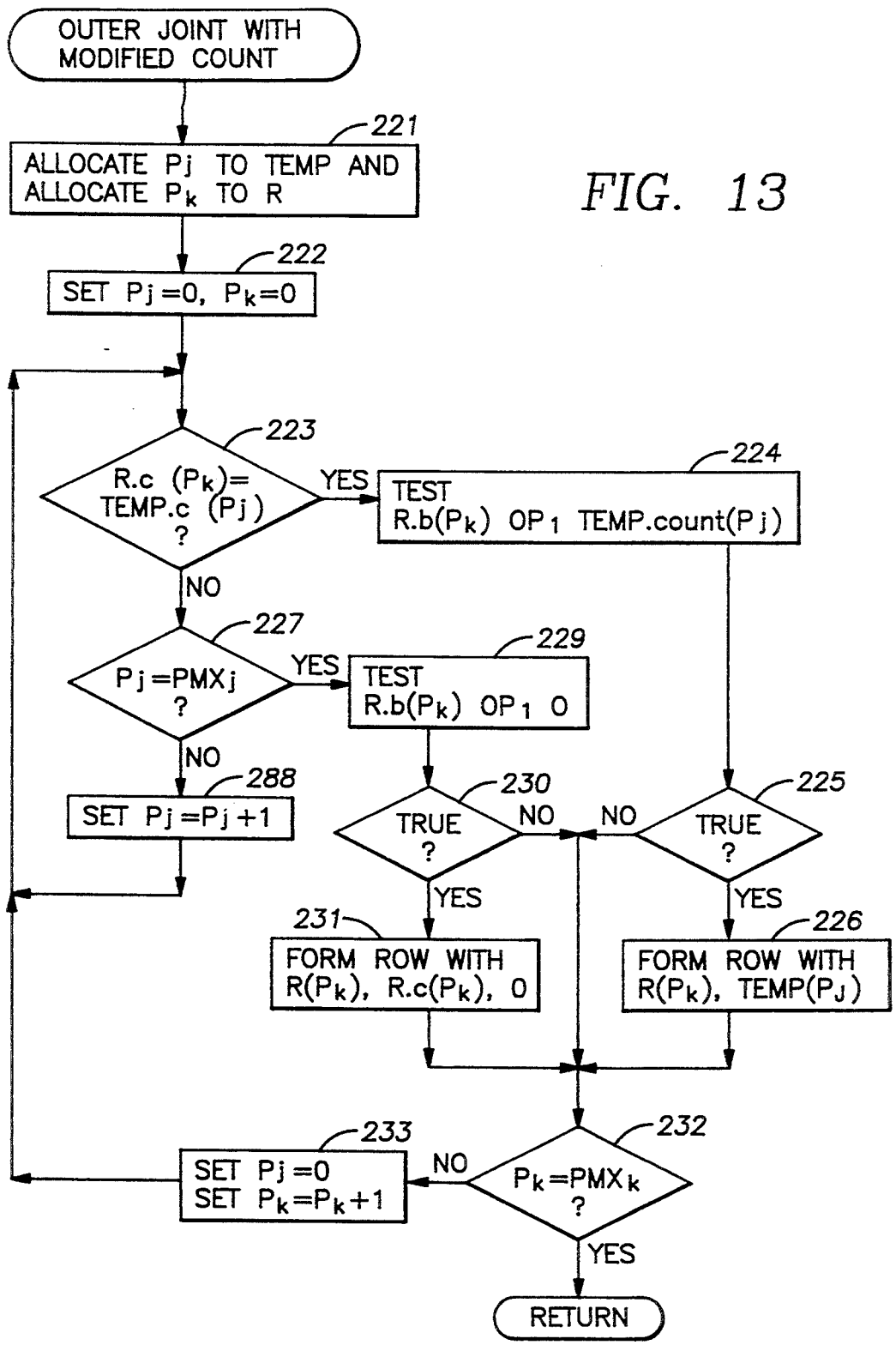
FIG. 13 is a flowchart of a specific procedure for performing a left outer join operation upon a count aggregate and applying different predicates to the joining and anti-joining tuples.

Turning now to FIG. 7, there is shown a flowchart of a procedure for executing a query block. This procedure follows the specified way of executing a SQL query block having a "SELECT", "FROM", "WHERE" and possibly a "GROUPBY" statement. This particular procedure should be modified, for example as shown in FIG. 13, to perform the method of the present invention.

In a first step 131 of FIG. 7, a new relation is formed having rows which are all combinations of all rows of all relations in the relations list. Then, in step 132, the predicate is tested for each row of the new relation, and rows are discarded for which the predicate is false. In other words, step 132 performs a restriction operation upon the new relation formed in step 131. In step 133, execution branches depending upon whether the aggregate list is empty. If there are not any aggregates specified by the aggregate list, then in step 134, a projection operation is performed upon the remaining rows of new relation by selecting the columns specified by the attribute list, and execution returns.

If step 133 determines that aggregates are specified, then execution branches to step 135. In step 135, execution branches depending on whether the "GROUPBY" list is empty. If the "GROUPBY" list is empty, then in step 136, an aggregation is performed over all remaining rows of the new relation. Then in step 137, the aggregates are selected for output, and execution returns.

If step 135 finds that the GROUPBY list is not empty, then in step 138, an aggregate is performed over groups of rows having the same values in all of the columns specified by the attribute names in the "GROUPBY" list. Then, in step 139, the columns specified by the attribute list are selected for output, together with the aggregates, and execution returns.

FIG. 7 defines the conceptual operations required for executing the query block. In practice, however, these conceptual operations can be performed in various ways. A fairly straightforward implementation is known as "tuple iteration" because it executes the query block by sequentially indexing the rows of the relations in the relation list so that all combinations of rows are indexed.

Figure 8:
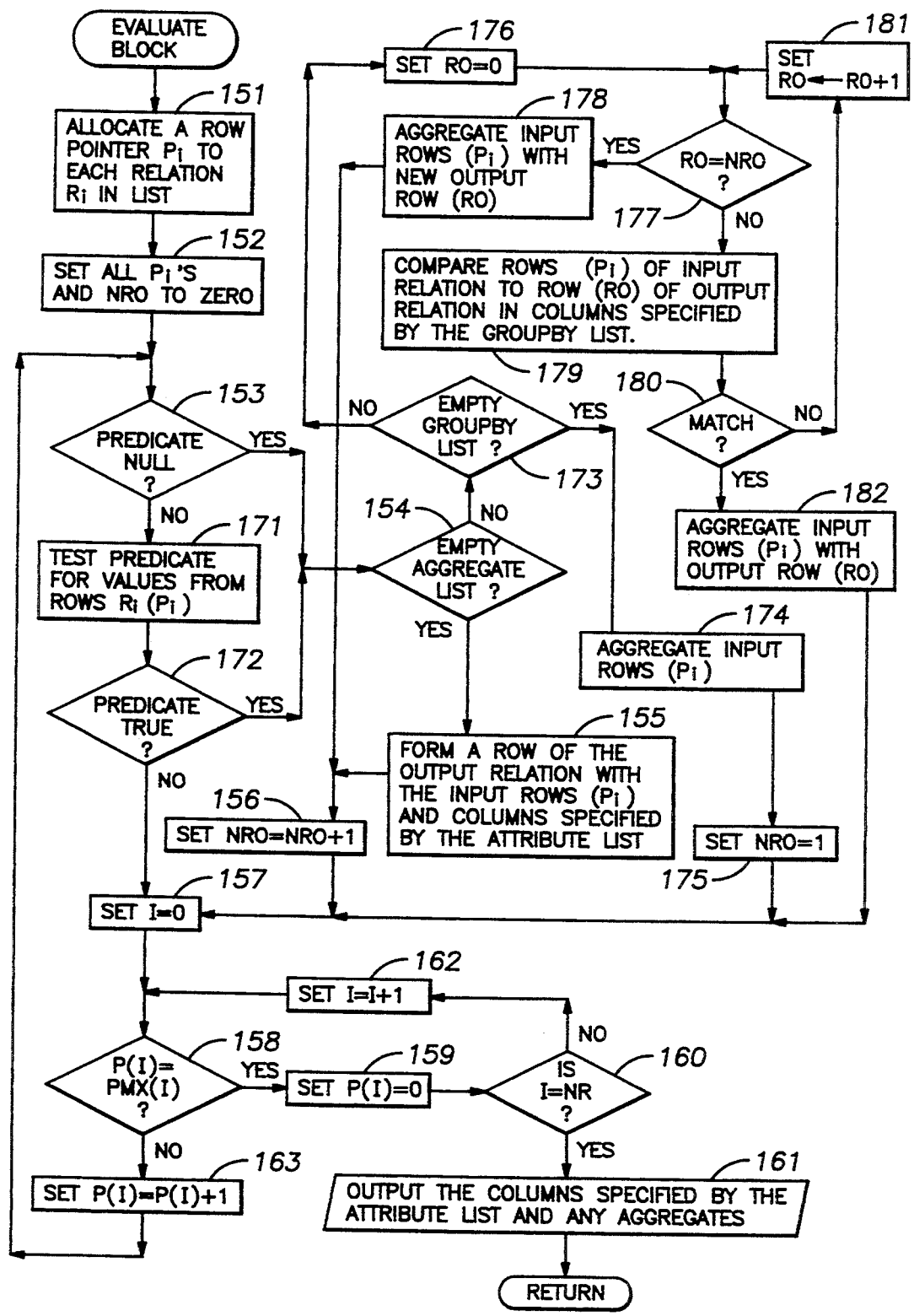
FIG. 8 is a detailed flowchart of a specific implementation of the flowchart of FIG. 7 in accordance with tuple iteration semantics.

Turning now to FIG. 8, there is shown a flowchart of a procedure for evaluating a query block by tuple iteration. In a first step 151, a row pointer $P_i$ is allocated to each relation $R_i$ in the relation list. Then, in step 152, all of the row pointers are set to zero, and a variable NRO, which is used to indicate the number of output rows, is also set to zero. At this point, iteration may begin. In step 153, execution branches depending on whether the predicate is null. If the predicate is null, then execution branches to step 154. In step 154, execution branches depending on whether there is an empty aggregate list. If the aggregate list is empty, then in step 155, a row of the output relation is formed with the columns specified by the attribute names in the attribute list. This is the end of the operations for a single iteration or combination of rows from the relations in the relation list. Since this iteration generated a new output row, the variable NRO is incremented by one in step 155.

Execution continues in step 157 to begin a series of tests which determine the next combination of row pointer values to index the next combination of input rows. In step 157, an index I is set to zero. Step 158 then checks whether the Ith row pointer has reached its maximum value of PMX(I). If so, then in step 159, this pointer is set to zero. Then, in step 160, the index I is compared to NR, which is one less than the number of relations in the relation list. Step 160 checks whether the index I has reached its maximum value. If so, then no further iteration is necessary. In step 161, the columns of output relation which are specified by the attribute list are selected for output together with any aggregates, and execution returns. Otherwise, in step 162, the index I is incremented, and execution loops back to step 158 to check the next row pointer. Eventually, a row pointer will be found in step 158 to be less than its maximum, or else all pointers will be at their maximum values and execution will return from step 160. If the Ith row pointer is found in step 158 to be less than its maximum value, then in step 163, that row pointer is incremented by one and execution loops back to step 153 to begin another iteration.

When step 153 determines that the predicate is not null, then in step 171, the predicate is tested for values from the rows $R_i(P_i)$. In the next step 172, execution branches depending upon whether the predicate is true. If so, execution branches to step 154 to further process that row. Otherwise, execution continues in step 157.

When step 154 determines that the aggregate list is not empty, then execution branches to step 173. In step 173, execution branches depending on whether the "GROUPBY" list is empty. If the "GROUPBY" list is empty, then the input row ($P_i$) is aggregated. The columns over which the input row is aggregated are specified by attribute arguments of the aggregate functions. The result is a single aggregate row, and therefore in step 175, the variable NRO is set to one. Execution then continues in step 157.

If step 173 determines that the "GROUPBY" list is not empty, then execution branches to step 176 to determine whether the input row ($P_i$) is part of a new group, or whether it is part of an already existing output group. This determination is made by scanning all of the existing output rows. In step 176, an output row pointer RO is set to zero. Then, in step 177, the output row pointer RO is compared to the number of output rows NRO. If the row pointer RO is equal to the number of output rows, then execution branches to step 178. In step 178, the input row ($P_i$) is aggregated with a new output row (RO). Execution then continues in step 155 to increase the number of output rows.

If, in step 177, it was found that the row pointer RO has not yet reached the current number of output rows NRO, then in step 179, the rows ($P_i$) of the input relation are compared to the rows (RO) of the output relation in all of the columns specified by the attribute list. In this regard, the aggregation process forms a new relation that includes the columns specified by the attribute list, any columns specified by the "GROUPBY" list not included in the attribute list, and a column for each aggregate function. Any column specified by the "GROUPBY" list that is not included in the aggregate list is a temporary column used by the scanning procedure, but which is not selected for output in step 161 at the end of evaluation. In the next step 180, execution branches to step 181 if there is not a match. In step 181, the scan index RO is incremented and execution loops back through steps 177, 179, and 180 until either a match is found in step 180 or all of the rows are scanned, as tested in step 177.

If step 180 finds a match, then in step 182, the input rows ($P_i$) are aggregated with the output row (RO) and execution then continues in step 157.

The present invention more particularly concerns un-nesting queries. Consider, for example, the following two-block query:

EXAMPLE 1

```
SELECT R.a
FROM R
WHERE R.b OP₁ (SELECT COUNT (*)
        FROM S
        WHERE R.c = S.c)
```

In this and the following examples, relations are named by capital letters, and attributes are named by small letters. Attribute names will be fully qualified by their relation names. Therefore, "R.c" represents the attribute c of the relation R.

Figure 9:
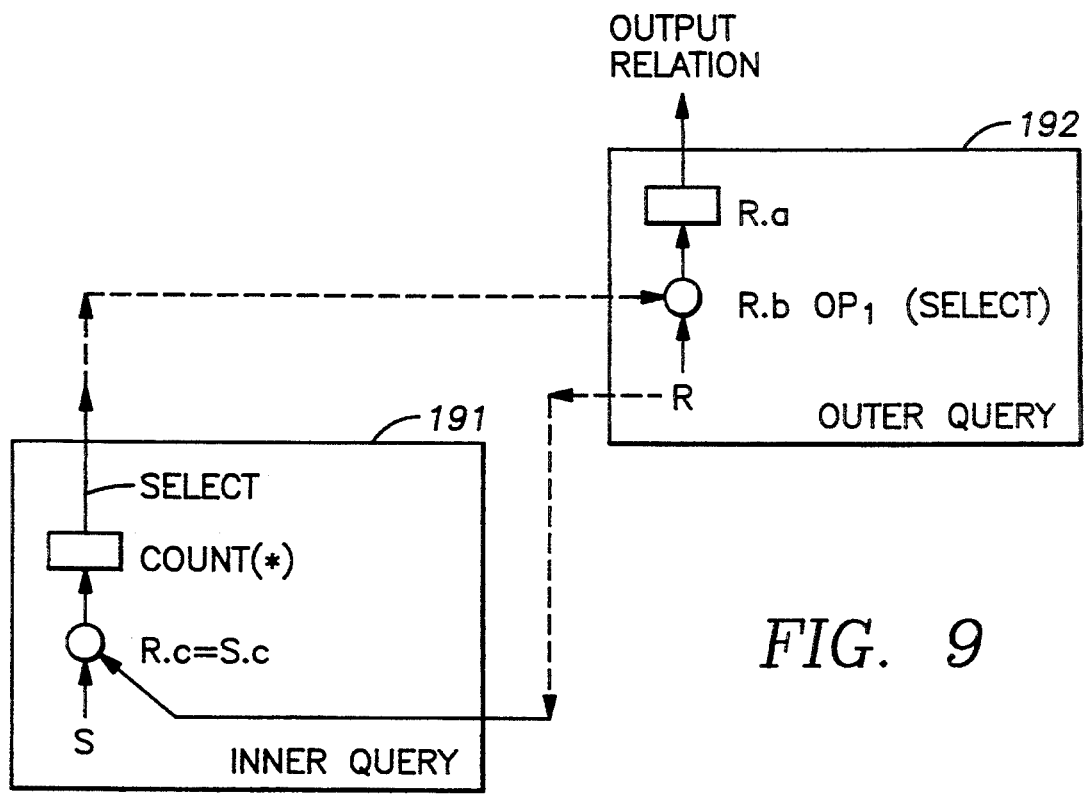
FIG. 9 is a data flow graph representation of two nested query blocks.

A query graph of this query is shown in FIG. 9. A node 191 represents the operations of the inner query, and a node 192 represents the operations of the outer query. In Example 1 above, the predicate (R.c=S.c) of the inner query references the relation R in the outer query. Therefore, the inner node cannot be precomputed.

The un-nesting procedure of Kim, supra., transforms the above query into the following two un-nested queries:
Query 1:
  TEMP (c, count)=
  SELECT S.c, COUNT (*)
  FROM S
  GROUPBY S.c
Query 2:
  SELECT R.a
  FROM R, TEMP
  WHERE R.c=TEMP.c and R.b OP₁ TEMP.count
The result of the first query is a temporary relation TEMP that is pipelined into the second query. The first query computes a count value associated with every distinct value in the c attribute of S.

Figure 10:
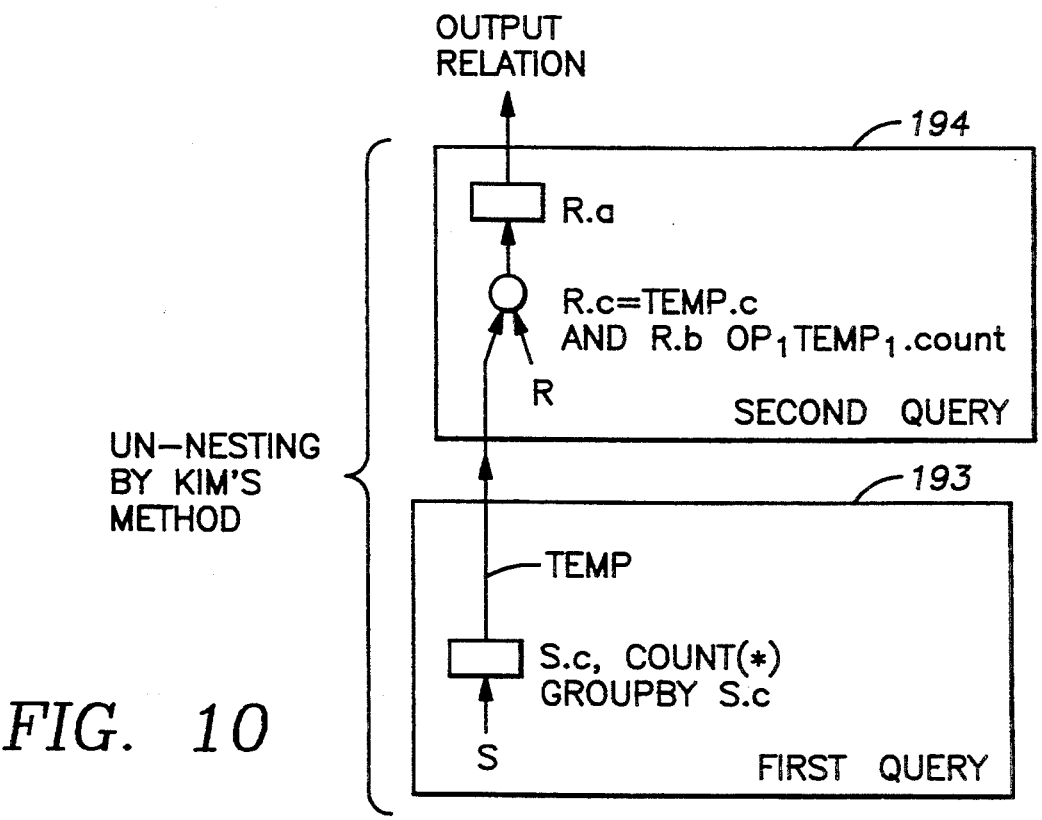
FIG. 10 is a data flow representation of two pipelined query blocks obtained by applying Kim's un-nesting method to the nested query blocks of FIG. 9.

A graph of the un-nested queries is shown in FIG. 10. The first query is represented by a node 197, and the second query is represented by a node 198. The first query computes a count for each distinct value of S.c. Kim concluded that the second query of FIG. 10 would give the same result as the outer query of FIG. 9 because the join predicate "R.c=TEMP.c" of node 194 would select the same aggregate for each value of R.c as would be computed by the inner node 191 of FIG. 9. Unfortunately, this conclusion incorrectly presumes that there is some value of S.c associated with each count computed by the inner query of FIG. 9 for each row of R. Therefore, Kim's method of FIG. 10 will not work correctly for a count aggregate as shown. Kim's method, however, will work correctly for other aggregates such as MIN, MAX, SUM and AVERAGE.

Consider now the following specific example where the aggregate is the count function:

EXAMPLE 2

```
SELECT DEPT.id
FROM DEPT
WHERE DEPT.pcs > (SELECT COUNT (*)
        FROM EMP
        WHERE EMP.dept_name = DEPT.name)
```

This nested query would find all departments that have more work stations than employees. The "*" in the argument list of the COUNT function denotes a count of all combinations of tuples that satisfy the predicate "EMP.dept_name= DEPT.name". If an attribute occurs as an argument of the COUNT function, then a count is made of all such tuples that have a non-null value for the specified attribute.

Applying Kim's un-nesting method to the nested query of Example 2 produces the two following queries:
  TEMP (dept_name, count)=
  SELECT EMP.dept_name, COUNT (*)
  FROM EMP
  GROUPBY EMP.dept_name
  SELECT DEPT.id
  FROM DEPT, TEMP
  WHERE DEPT.name=TEMP.dept_name
  AND DEPT.pcs>TEMP.count
If there is a new department with no employees, but at least one work station, then Kim's method gives an incorrect result. In this case, the relation DEPT will include a tuple or row with DEPT.pcs>0, but the relation EMP will not include any tuple or row "associated" with that tuple or row. In more precise terms, the tuple with DEPT.pc>0 of DEPT.pcs will not have any tuples in EMP that will be joined with it by the join correlation predicate DEPT.name=EMP.dept_name. Therefore, the WHERE statement of the original query will have its predicate satisfied by that tuple because DEPT.pcs will have a value>0 and COUNT (*) will have a value of 0. But the un-nested query will not have its predicate satisfied by that tuple because the join correlation predicate DEPT.name=TEMP.dept_name will not be true for that particular department.

Figure 11:
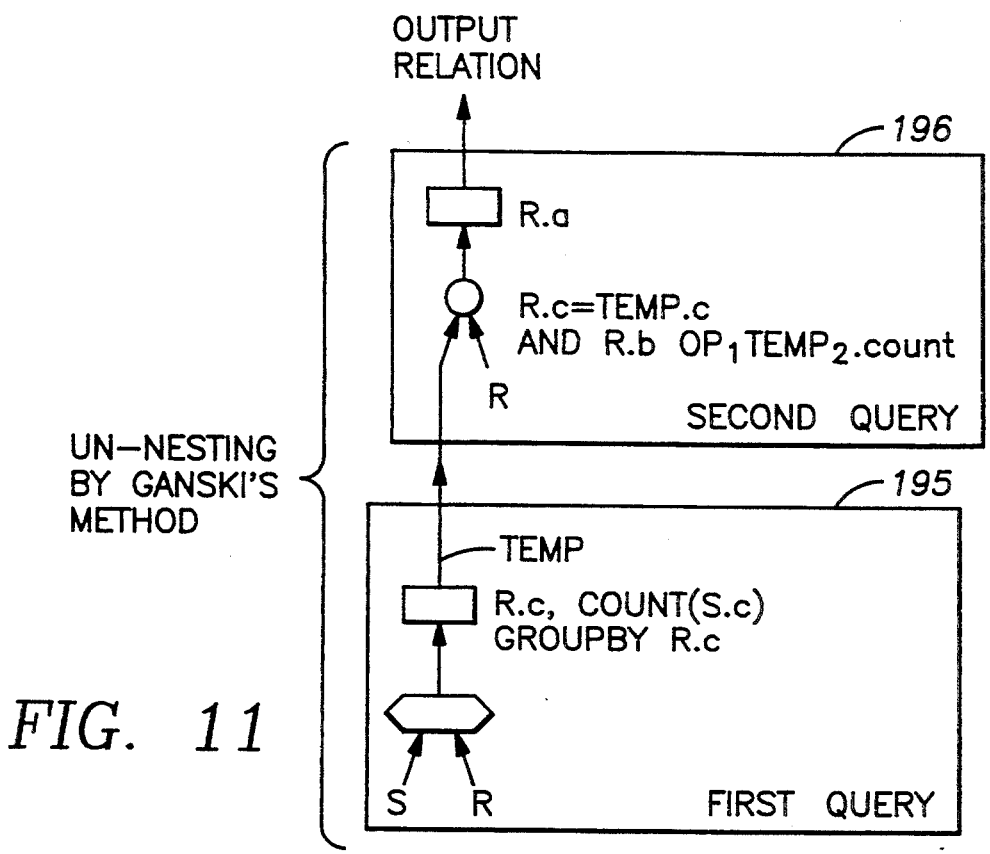
FIG. 11 is a data flow representation of two pipelined data blocks obtained for a count aggregate when the nested query blocks of FIG. 9 are un-nested by Ganski's method.

A solution to the so-called "count bug" was described in *Ganski*, supra. With respect to Example 1 above, for the case of AGG being the COUNT function, Ganski reasoned that a tuple r of R would be lost after the join in Kim's second query if it does not join with any tuples of S. However, the COUNT associated with r is 0 and if R.b $OP_1$ 0 is true, tuple r should appear in the result. In order to preserve tuples in R that have no joining tuples in S, Ganski proposed that a (left) outer join (OJ) should be performed when the COUNT aggregate is present between two blocks. In this case, the un-nested query becomes:

Query 1:
TEMP (c, count) =
SELECT R.c, COUNT (S.c)
FROM R,S
WHERE R.c OJ S.c
GROUPBY R.c
Query 2:
SELECT R.a
FROM R, TEMP
WHERE R.c = TEMP.C
    AND R.b $OP_1$ TEMP.count A corresponding query graph is shown in FIG. 11. The first query is represented by a node 195, and the second query is represented by a note 196. The (left) outer join operation (OJ) preserves every tuple of R, and consequently a count is computed for every distinct value of R.c. Consider, for example, the following tuples for the relations R and S:

| R.a   | R.b | R.c    | S.c   |
| ----- | --- | ------ | ----- |
| Car   | 1   | Red    | Red   |
| Truck | 2   | Green  | Blue  |
| Boat  | 4   | Blue   | Blue  |
| House | 0   | Orange | Black |

A join with a join correlation predicate of R.c=S.c would create a new relation with the following tuples:

| R.a  | R.b | R.c  | S.c  |
| ---- | --- | ---- | ---- |
| Car  | 1   | Red  | Red  |
| Boat | 4   | Blue | Blue |
| Boat | 4   | Blue | Blue |

If the tuples were grouped by distinct joining values of R.c or S.c and aggregated by COUNT(S.c), the following relation TEMP would be generated:

| R.c  | S.c  | COUNT (S.c) |
| ---- | ---- | ----------- |
| Red  | Red  | 1           |
| Blue | Blue | 2           |

The counts for this relation would be different from the counts for distinct values of R.c generated by iterative evaluation of the inner query in FIG. 9 because it would never return a count of zero. By replacing the join with a left outer join, a new relation with the following tuples would be generated:

| R.a   | R.b | R.c    | S.c  |
| ----- | --- | ------ | ---- |
| Car   | 1   | Red    | Red  |
| Truck | 2   | Green  | ^    |
| Boat  | 4   | Blue   | Blue |
| Boat  | 4   | Blue   | Blue |

-continued

| R.a   | R.b | R.c    | S.c |
| ----- | --- | ------ | --- |
| House | 0   | Orange | ^   |

For every tuple of R having a value for R.c which does not join with a value of S.c for any tuple of S, a new tuple is generated by appending null values ( ) to that tuple of R. The tuples of R having a value for R.c which does not join with a value of S.c for any tuple of S will be referred to as the anti-joining tuples of R. Because a count over a specified attribute will not count null values for that attribute, a count over the column S.c of the outer join will return a value of zero for the anti-join tuples:

TEMPOJ (c, count) =

| R.c    | COUNT (S.c) |
| ------ | ----------- |
| Red    | 1           |
| Green  | 0           |
| Blue   | 2           |
| Orange | 0           |

Ganski's method avoids the count bug by providing a correct count associated with each distinct value of R.c. Ganski's method also provide proper un-nesting where the inner query does not have an equi-join correlation predicate. An equi-join correlation predicate is of the form f1(R)=f2(S) where f1 and f2 are any functions on tuples of R and S, respectively.

By applying Ganski's method to the nested query blocks of Example 2, the following un-nested queries are obtained:

TEMP (name, count) =
SELECT DEPT.name, COUNT (EMP.dept_name)
FROM DEPT, EMP
WHERE DEPT.name OJ EMP.dept_name
GROUPBY DEPT.name
SELECT DEPT.id
FROM DEPT, TEMP
WHERE DEPT.name = TEMP.name
    AND DEPT.pcs > TEMP.count Ganski's method can convert two nested query blocks into a single query in SQL query language. In this case, the operation of the second query is performed by a "HAVING" statement. A GROUPBY statement specifies grouping according to a primary key or surrogate column having a distinct value for each tuple or row. Such an attribute will be designated by "#". The result for Example 2 is as follows:

SELECT DEPT.id
FROM DEPT, EMP
WHERE DEPT.name OJ EMP.dept_name
GROUPBY DEPT.#
HAVING DEPT.pcs > COUNT (EMP.dept_name)

In accordance with the present invention, there is provided an alternative method of un-nesting a nested query having a count aggregate. This alternative method is illustrated by the query graph in FIG. 12. The first query, represented by the node 198, is similar to the first query of Kim's method (node 193 in FIG. 10). In the second query, represented by node 197 of FIG. 12, the method of the present invention performs a (left) outer join, and applies a different predicate to the anti-joining tuples than to the joining tuples. In particular, when a nested inner query has an equi-join predicate joining a relation of the inner query to an outer query and a count aggregate, the method of FIG. 12 removes the equi-join predicate from the inner query and places a corresponding conjunctive (left) outerjoin predicate term in the predicate of the outer query, performs the count aggregate for each distinct value of the joining attribute of the relation of the inner query, and in the outer query applies different predicates to the joining and anti-joining tuples such that the predicate of the anti-joining tuples is evaluated assuming a count value of zero.

Figure 12:
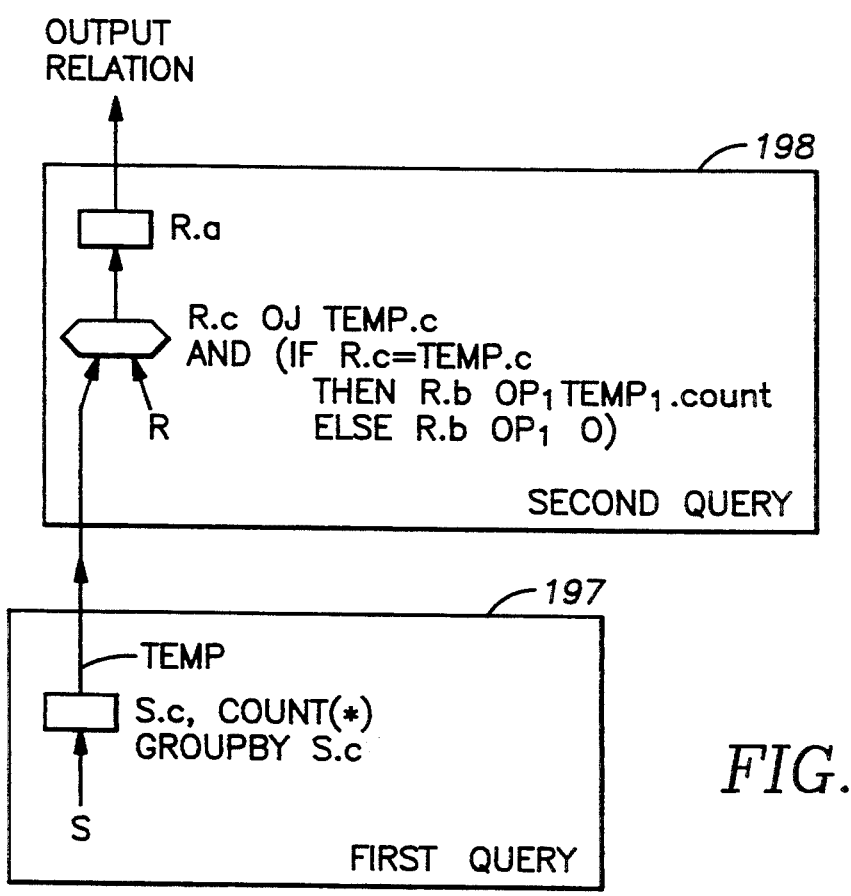
FIG. 12 Is a data flow representation of two pipelined query blocks obtained for a count aggregate when the nested query blocks of FIG. 9 are un-nested by the method of the present invention.

In Example I, for a count aggregate, the method of FIG. 12 gives the following two un-nested queries:

```
TEMP (c, count) =
SELECT S.c, COUNT (*)
FROM S
GROUPBY S.c
SELECT R.a
FROM R, TEMP
WHERE R.c OJ TEMP.c
    AND ( IF R.c = TEMP.c
        THEN R.b OP₁ TEMP.count
        ELSE R.b OP₁ 0)
```

As will be described below with respect to FIG. 13, the IF-THEN-ELSE operations are best performed by directly applying the predicate operation $OP_1$ between the left join relation R and a count value when a joining tuple of R is found, and applying the predicate operation $OP_1$ between the left join relation R and a value of 0 when an anti-joining tuple of R is found. In the following examples, the result of the IF-THEN-ELSE operations will be expressed simply as first the predicate applied to the join tuples and second the predicate applied to the anti-join tuples as follows:

[R.b $OP_1$ TEMP.count | R.b $OP_1$ 0]. With this notation, the query of Example 2 is un-nested as follows:

```
TEMP (dept_name, count) =
SELECT EMP.dept_name, COUNT (*)
FROM EMP
GROUPBY EMP.dept_name
SELECT DEPT.id
FROM DEPT, TEMP
WHERE DEPT.name OJ TEMP dept_name
    AND [DEPT.pcs > TEMP.count | DEPT.pcs > 0]
```

Under certain circumstances, the method of FIG. 12 may be more efficient than Ganski's method. The heuristic argument is based on (1) the number of tuples that flow from each node in the query graphs corresponding to the two methods, and (2) the number of tuples that have to be processed by each groupby and outer join operation. Both methods involve accessing relations R and S. Clearly $|TEMP_1| \leq |S|$ and $|R| \leq |R\ OJ\ S|$. Assume that $|S| < |R|$. The number of tuples flowing from the groupby operation to the outer join operation in the method of FIG. 12 is equal to $|TEMP_l|$. The number of tuples flowing from the outer join operation to the groupby operation in Ganski's method is equal to $|R\ OJ\ S|$. Clearly $|TEMP_1| < |R\ OJ\ S|$. The number of tuples processed by the groupby operation and the outer join operation in the method of FIG. 12 is each less than the corresponding number of tuples in Ganski's method. Hence, if $|S| < |R|$, the method of FIG. 12 should perform better than Ganski's method. This heuristic argument, however, ignores the fact that Ganski's method joins two base relations, whereas the method of FIG. 12 joins a base relation with a temporary relation. As a result, Ganski's method might be able to employ more join methods, and the optimizer should take any alternative join methods into account. In any event, the present invention provides a different way of un-nesting a nested query having a COUNT aggregate when the correlation predicates are all equi-joins.

Turning now to FIG. 13, there is shown a flowchart of a procedure for performing a left outer join and applying a predicate to the join tuples different from the predicate applied to the anti-join tuples. In particular, the count associated with the anti-join tuples is modified so that it has a value of zero for the anti-join tuples. The procedure of FIG. 13 takes advantage of the fact that the relation TEMP has a column with an attribute c that has distinct values. The row pointer $P_j$ to the relation TEMP is used as an index in an inner loop, and if no matches to the distinct column c occur, then an anti-join tuple is formed with the relation R. Otherwise, if a joining tuple is found, the inner loop is exited since the join is performed with a distinct value of TEMP.c, and therefore no other joining tuple would be found by further iterations.

In a first step 221, a row pointer $P_j$ is allocated to the relation TEMP, and a row pointer $P_k$ is allocated to the relation R. Then, in step 222, the row pointers are set to zero. Both the inner and outer loops begin in step 223 with the join comparison between the row $P_k$ and attribute c of the relation R and the row $P_j$ and attribute c of the relation TEMP. If joining tuples are found, then the inner loop is exited to step 224. In step 224, the predicate for the joining tuples is applied. In this case, a test is made of the operation $OP_1$ between the attribute R.b at row $P_k$ and the attribute TEMP.count at row $P_j$. If this predicate is found to be true in step 225, then in step 226, an output row is formed by joining the $P_k$th row of the relation R with the $P_j$th row of the relation TEMP.

Returning now to step 223, if joining tuples are not found in step 223, then in step 227, the end of the inner loop is tested. If the row pointer $P_j$ is not equal to its maximum value PMXj, then the inner loop continues in step 228 by incrementing the row pointer $P_j$ and execution loops back to step 223. If the row pointer $P_j$ reaches its maximum value in step 224, then there are no joining tuples for the value in the $P_k$th row of the attribute R.c. Therefore, an anti-join tuple pair has been found. In this case, an anti-join predicate is tested in step 229 that is different from the join predicate applied in step 224. For the anti-join predicate 229, it is assumed that the value of the attribute TEMP.count has a value of zero. If this anti-join predicate is true, as tested in step 230, then in step 231, an output row is formed by joining the $P_k$th row of the relation R with a value of the $P_k$th row of the attribute R.c, and the value of zero. In other words, the row 231 is the row that would have been present in the absence of the so-called "count bug".

From steps 231 and 226, or if a false logical value is found in steps 225 or 230, then in step 232, the end of the outer loop is tested by comparing the pointer $P_k$ to a predetermined maximum value $PMX_k$. If this maximum value is reached, execution returns. Otherwise, execution continues in step 233 by setting the row pointer $P_j$ to zero, and incrementing the row pointer $P_k$ by one. Execution then loops back to step 223.

The method of FIG. 4 is readily applicable to nested queries of more than two levels of nesting so long as the correlation predicates of the COUNT blocks are "neighbor predicates". By definition, a "neighbor predicate" is an equi-join correlation predicate that references the relation in its own block and the relation from the immediately enclosing block. If a COUNT block does not have a "neighbor predicate", then the method of FIG. 12 is more difficult to apply than Ganski's method of FIG. 11, and consequently Ganski's method should be used for un-nesting of the count block. The use of the method of FIG. 12 for un-nesting blocks having more than two levels of nesting is shown in the following example:

EXAMPLE 4

```
SELECT R.a
FROM R
WHERE R.b < (SELECT COUNT (*)
    FROM S
    WHERE R.c = S.c
    AND S.d > = (SELECT COUNT (*)
        FROM T
        WHERE S.e = T.e))
```

Notice that all correlation predicates are neighbor predicates.

Kim, supra, page 465, disclosed that his method is applicable to multiple nested blocks by applying it to pairs of inner and outer nested blocks beginning at the bottom of the hierarchical query graph. In other words, a search is made down to a leaf node of the query graph, and the method for un-nesting of a pair of blocks is applied recursively to an inner nested leaf node and its outer parent node. Ganski, supra, pages 31-32, proposed a similar recursive procedure upon the query graph to apply his method upon multiple nested blocks. The same approach can be used to apply the method of FIG. 12. The result of the query is obtained by evaluating the following three queries.

```
TEMP1 (e, count) =
SELECT T.e, COUNT (*)
FROM T
GROUPBY T.e
TEMP2 (c, count) =
SELECT S.c, COUNT (*)
FROM S, TEMP1
WHERE S.e OJ TEMP1.e
    AND [S.d > TEMP1.count ¦ S.d > = 0]
GROUPBY S.c
SELECT R.a
FROM R, TEMP2
WHERE R.c OJ TEMP2.c
    AND [R.b < TEMP2.count ¦ R.b < 0]
```

Although recursive operations upon query graphs are both a convenient and readily understood way of extending a method for un-nesting two nested queries to nestings of multiple queries, an equivalent method would be to use symbolic execution upon algebraic expressions representing the relational operations of the nested queries. Nesting is symbolically represented in such algebraic expressions as a function which appears in an outer nested query and has an argument including the relational operations of an inner nested block. The method for evaluating the function for the pair of outer and inner nested blocks defines a rule or pattern which is applied or matched to the algebraic expression, and when a match is found, the substitution or change to the expression that should be performed to remove the function. Hardy, supra, discloses further details regarding symbolic execution.

The un-nested query blocks themselves specify an order of evaluation that is not necessarily the best order due to the commutative and associative properties of joins, and similar properties applicable to some operations between joins and outer-joins. Dayal, supra, exploits these properties to generalize Ganski's solution for queries with more than 2 blocks. A linear query with multiple blocks gives rise to a 'linear J/OJ expression' where each instance of an operator is either a join or an outer join. A general linear J/OJ expression would like:

R J/OJ S J/OJ T J/OJ U J/OJ . . .

Relation R is associated with the outermost block, relation S with the next inner block, and so on. An outer join is required if there is a COUNT between the respective blocks. In all other cases (AVG, MAX, MIN, SUM), only a join is required. The joins and outer joins are evaluated using the appropriate predicates.

Since joins and outer joins do not commute with each other in general, a legal order may be obtained by computing all the joins first and then computing the outer joins in a left to right order (top to bottom, if you like) (Dayal, supra.) For example, the expression R OJ S J T J U OJ V J W can be legally evaluated as ((R OJ (S J T J U)) OJ (V J W)). Since the joins may be evaluated in any order, the least expensive join order is selected for joining relations S, T and U.

Consider the following three block linear query:

```
SELECT R.a
FROM R
WHERE R.b OP1 (SELECT COUNT (S.*)
    FROM S
    WHERE R.c OP2 S.c
    AND S.d OP3 (SELECT COUNT (T.*)
        FROM T
        WHERE S.e OP4 T.e
        AND R.f OP5 T.f))
```

The corresponding linear expression is R OJ S OJ T and hence a legal order is (R OJ S) OJ T. The result is obtained by executing the following two queries:
Query 1:
  TEMP$_1$ (#, a, b, *)=
  SELECT R.#, R.a, R.b, S.*
  FROM R, S, T
  WHERE (R OJ S) OJ T
  GROUP BY R.#, S.#
  HAVING S.d OP3 COUNT(T.*)
Query 2
  SELECT TEMP$_1$.a
  FROM TEMP$_1$
  GROUP BY TEMP$_1$.#
  HAVING TEMP$_1$.b OP$_1$COUNT(TEMP$_1$.*)

The outer join predicates are implicit in Query 1. The predicate for R OJ S is (R.c OP$_2$ S.c), while the predicate for the second outer join with T is (S.e OP$_4$ T.e and R.f OP$_5$ T.f). Tuples from Query 1 may be pipelined into Query 2. Notice that if the query has d blocks, the total number of joins and outer joins will be (d-1). These will be followed by (d-1) groupby-having operations.

Although a valid J/OJ ordering is obtained by performing all the joins first, followed by the outer joins from left to right, it is sometimes possible to change this order. Consider, for example, the following query:

```
SELECT R.a
FROM R
WHERE R.b OP₁ (SELECT COUNT (S.*)
    FROM S
    AND S.d OP₂ (SELECT MAX (T.d)
        FROM T
        WHERE R.f OP₃ T.f))
```

The J/OJ expression for the above query is R OJ (S J T). Since there is no correlation predicate between the S and T relations, a cartesian product must be performed to compute (S J T). The outer join is then performed using the predicate (R.f OP₃ T.f). However, for each (r, s) pair, where r ∈ R and s ∈ S, MAX (T.d) depends only on r. Hence, we can precompute MAX (T.d) associated with each tuple of R as follows:

TEMP₁ (#, a, b, max)=
SELECT R.#, R.a, R.b, MAX (T.d)
FROM R, T
WHERE R.f OP₃ T.f—OJ
GROUP BY R. #

Notice that |TEMP₁| = |R|. Essentially, TEMP₁ has all the attributes of R required for further processing along with the MAX (T.d) associated with each tuple of R. MAX (T.d) can be computed in this fashion because it occurred in the last block. Any aggregate that does not occur in the last block depends on the results of the blocks below it and hence cannot be evaluated before the blocks below it are evaluated. Also, an outer join was performed between R and T even though we were computing MAX (T.d). This is because COUNT (S.*) indirectly depends on each tuple of R as R is referenced inside the third block which is nested within the second block. Hence, all tuples of R must be preserved. For a tuple of R with no joining tuples in T, the MAX value is set to a null value (ˆ). (Any comparison where one or both of the operands is null (ˆ) evaluates to unknown, which SQL regards as false for query evaluation purposes.) The original query is now re-written as follows:

```
SELECT TEMP₁.a
FROM TEMP₁
WHERE TEMP₁.b OP₁ (SELECT COUNT (S.*)
    FROM S
    WHERE S.d OP₂ TEMP₁.max)
```

We now have a correlation predicate between TEMP₁ and S, thus avoiding a cartesian product. Similar ideas were presented in *Dayal*, supra, in his section titled "Positioning G-Agg Operations". In that section, Dayal presents rules for computing aggregates before G-joins.

In any case, the above example shows that it is possible to precompute the bottom-most aggregate (BMA) if the number of outer relations referenced in the last block have already been joined. Although in this example the bottom-most aggregate depended only on one outer relation, a further example is presented below where the bottom-most aggregate depends on more than one relation.

It is also possible to evaluate pipelined queries in a strictly top-down order, performing the joins and outer joins in the order they occur. Evaluation in a top-down manner may permit the method of FIG. 12 to be applied to a larger number of contiguous blocks at the end of the query. However, care must be taken to ensure that any join that is present just below an outer join is also evaluated as an outer join. Consider the following example:

```
SELECT R.a
FROM R
WHERE R.b OP₁ (SELECT COUNT (S.*)
    FROM S
    WHERE R.c OP₂ S.c
    AND S.d OP₃ (SELECT MAX (T.d)
        FROM T
        WHERE S.e OP₄ T.e
        AND R.f OP₅ T.f))
```

The J/OJ expression is R OJ (S J T). The join predicate between S and T is (S.e OP₄ T.e) and the outer join predicate is (R.c OP₂ S.c and R.f OP₅ T.f). Assume that the join between S and T is very expensive and should be possibly avoided. Could we evaluate (R OJ S) first? It turns out that we can indeed perform (R OJ S) first. However, some precautions/modifications are necessary.

It is clear that if an R tuple has no matching S tuples, the count associated with that R tuple is 0. As pointed out in *Murali*, supra, this R tuple may be routed to a higher node in the query tree so that it does not participate in the next join operation with T.

We thus need to consider only the join tuples of the form (r, s) from the outer join, where r ∈ R and s ∈ S. Let us focus our attention on a single tuple of R. When the join with T is evaluated using the predicate (S.e OP₄ T.e AND R.f OP₅ T.f), it is quite possible that none of these (r, s) tuples join with any tuples of T. In this case, the r tuple will be lost. However, if r.b equals 0, r is a result tuple and hence must be preserved. On the other hand, if some of the (r, s) tuples do join with some T tuples, it may so happen that after we do the groupby by (R. #, S. #) and evaluate MAX (T.d), none of the s.d values in the (r, s) tuples satisfy (s.d OP₃MAX (T.d)). We may be tempted to discard all the (r, s) groups. Again, if r.b equals 0, we need to preserve r.

We can preserve r if we perform the next join as an outer join. Also, the groupby operator must not discard any (r, s) group not satisfying (s.d OP₃MAX (T.d)). Instead, it must pass it on preserving the R portion of the tuple and nulling out the S portion of the tuple.

The same ideas were presented in *Murali*, supra, when un-nesting tree queries. Summarizing, if we encounter the expression R OJ S OJ T J U J V, we could evaluate it as ((R OJ S) OJ (T J U J V)). The above order corresponds to evaluating all the joins first. Another evaluation order could be ((((R OJ S) OJ T) OJ (U J V)). Now we have an outer join between T and U. Carrying this idea one step further, the above expression may also be evaluated as ((((R OJ S) OJ T) OJ U) OJ V).

By applying the methods of FIGS. 10, 11 and 12 to pairs of blocks in a nested query having multiple blocks, it is possible to generate a multiplicity of alternative query graphs. The query optimizer may compute a cost associated with each query graph, and select the least expensive graph for execution.

In the following example, it will be assumed that the query optimizer operates on a kind of "join graph". An example of such a join graph is shown in FIG. 14. The graph G=(V, E) consists of a set of vertices V and a set of directed edges E. There is a one-one correspondence between the blocks of the query and the elements of V.

Each element of V, except for the first vertex, is labeled either C (COUNT) or NC (Non COUNT). This labeling is clearly suggestive of the kind of aggregate (COUNT or Non COUNT) present in that block. The vertices are numbered 1 through d, where d is the current number of vertices in the graph. A directed edge is drawn from vertex i to j (i<j) if there is a correlation predicate in the jth block between the relations of blocks i and j.

The method of FIG. 12 may be applied to the last k blocks of a query ($0 \leq k \leq d$) if the last k vertices of the graph of the query satisfy the following properties:

(1) The in degree of every C vertex is at most 1;
(2) The edge incident on a C vertex corresponds to a neighbor predicate;
(3) All the edges incident with the last k vertices correspond to equi-join correlation predicates; and
(4) The relations in the first d-k blocks have already been joined.

The bottom-most aggregate may be precomputed if the in degree of the last vertex is at most 1.

The operations on the graph are as follows:

(1) When the relations of two or more blocks are joined, the corresponding vertices are collapsed into one vertex. The edges adjacent to these vertices are removed, while all the edges that connect these vertices to other vertices are preserved. Multiple edges are replaced by a single edge.
(2) Let d-1 and d be the last two vertices in the graph. If the BMA is computed, the last vertex d is removed from the graph and the edge incident on d is connected to d-1.

Notice that we may be able to apply the method of FIG. 12 only after joining some relations. For example, we may apply the method of FIG. 12 to the last block after joining R and S in the query of Example 3. This is because the predicate (R.f=T.f) becomes a neighbor predicate only after relations R and S are joined. Thus, the number of blocks for which we may apply the method of FIG. 12 can change dynamically. Similarly, the bottom-most aggregate may have originally depended on more than one outer relation, but, after these relations have been joined, the in degree of the last vertex will become 1. The bottom-most aggregate may be precomputed at this point.

When a series of consecutive m joins are encountered in a J/OJ expression, one may be tempted to evaluate all the joins using the cheapest order. However, the joins should be evaluated incrementally. In other words, the first i joins should be evaluated at a time, where $1 \leq i \leq m$. This ensures that we may be able to apply the method of FIG. 12 to a larger group of contiguous blocks at the end of the query.

Turning now to FIG. 15, there is shown a flowchart of an un-nesting procedure that incorporates the above considerations for un-nesting multiple nested quires. In the first step 251 of FIG. 15, execution branches depending on whether the bottom-most aggregate can be precomputed. It can be precomputed if the predicate of its node does not reference a relation in the relations list of any other nodes in which the bottom-most aggregate is nested. If so, then in step 252, the bottom-most aggregate is computed and its corresponding node is removed from the query graph. Then, in step 253, the query procedure of FIG. 15 is called recursively to process the amended query graph (G'). Execution then returns.

When step 251 finds that the bottom-most aggregate cannot be precomputed, then in step 254, the nodes are identified to which Kim's method is applicable. These are the nodes that have aggregates other than COUNT, and which have equi-join predicates, and nodes with equi-join predicates and COUNTs known to always generate a count >0. Then, in step 255, execution branches when Kim's method can be applied to all nodes. If so, in step 256, Kim's method is applied from the bottom to the top of the query graph, and execution returns.

If Kim's method cannot be applied to all nodes, then in step 257, the aggregate nodes to Which Kim's method cannot be applied are inspected to determine whether the method of FIG. 12 is applicable. The method of FIG. 12 is applicable to the count nodes with equi-join predicates that are neighbor predicates. If so, then in step 258, the method of FIG. 12 or Ganski's method is chosen for these nodes depending upon a comparison of the computational cost of each respective method to each particular node. In step 259, Ganski's method is chosen for the remaining aggregate nodes, because it is the only practical method. Then, in step 260, possible execution orders are considered, beginning first with the possibility of joins followed by outer-joins. If joins are followed by outer-joins, then in step 261, for i=1 to m, the first i joins are evaluated using the least costly join order. Then, in step 262, the un-nesting procedure of FIGS. 15 and 16 is recursively called for the new graph including the remaining nodes, and execution returns.

If step 260 determines that there is not a sequence of joins followed by outer-joins, then execution branches to step 263. In step 263, execution returns if there is not a sequence of joins within outer joins. If so, then in step 264, for i=1 to m, the first i joins are evaluated using the least costly join order. Then, in step 265, the un-nesting procedure of FIGS. 15 and 16 is called recursively to operate upon the graph (G') of the remaining nodes. Then, in step 266, the first outer join is evaluated, and the first join is replaced by an outer join. Then, in step 267, the un-nesting procedure of FIGS. 15 and 16 is called recursively with the graph (G') including the remaining nodes. Execution then returns.

Figure 16:
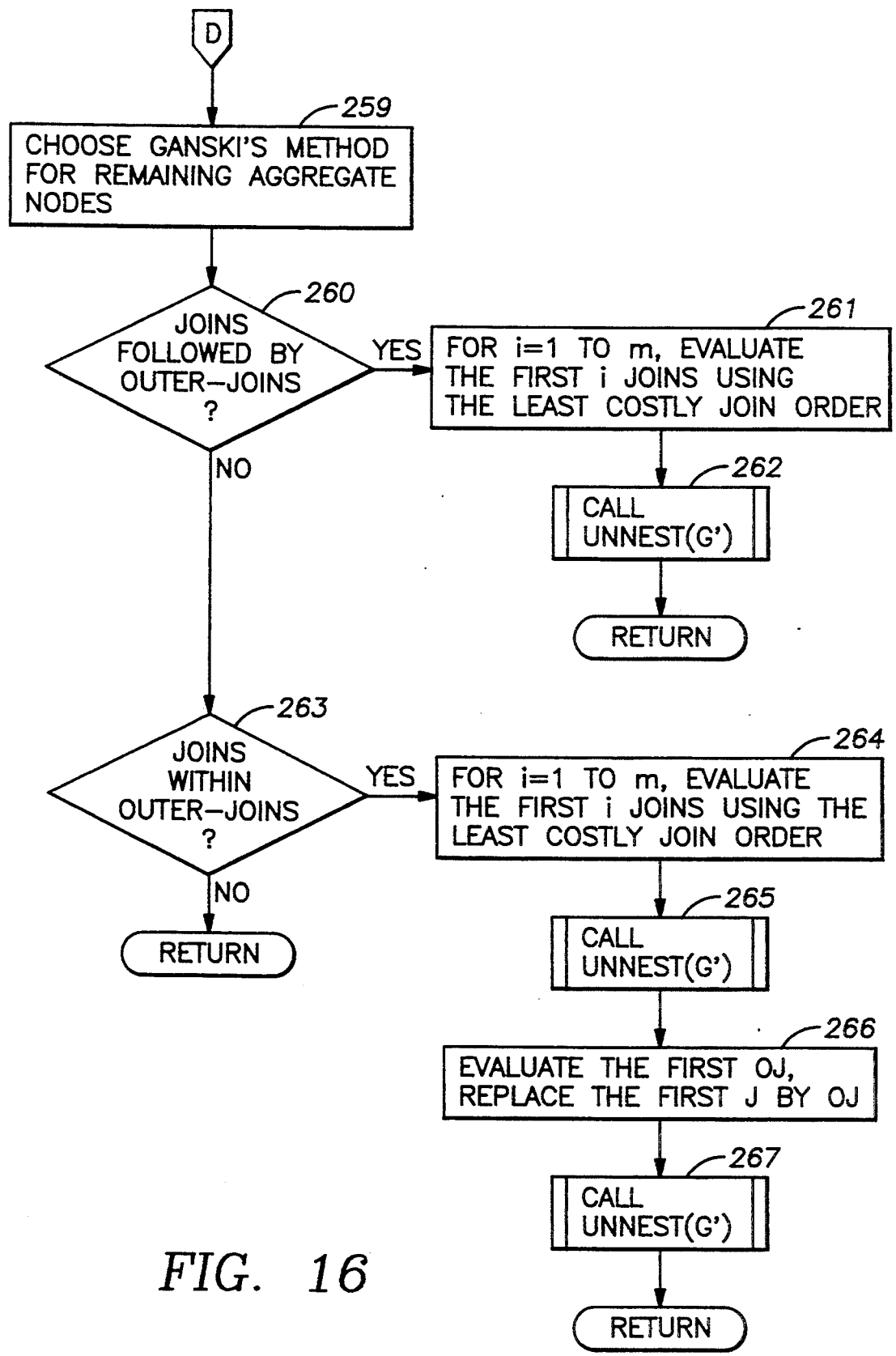

Consider the application of the procedure of FIGS. 15 and 16 to the following nested query, represented by the join graph of FIG. 14:

```
SELECT R.a
FROM R
WHERE R.b OP₁
    (SELECT COUNT (S.*)
    FROM S
    WHERE R.c = S.c
    AND S.d OP₂
        (SELECT AVG (T.d)
        FROM T
        WHERE S.e = T.e
        AND T.g OP₃
            (SELECT SUM (U.g)
            FROM U
            WHERE S.h = U.h
            AND T.i = U.i)))
```

The J/OJ expression is R - - - OJ - - - S - - - J - - - T - - - J - - - U. The alternative query plans shown in FIGS. 17 to 22 are possible.

Figure 17:
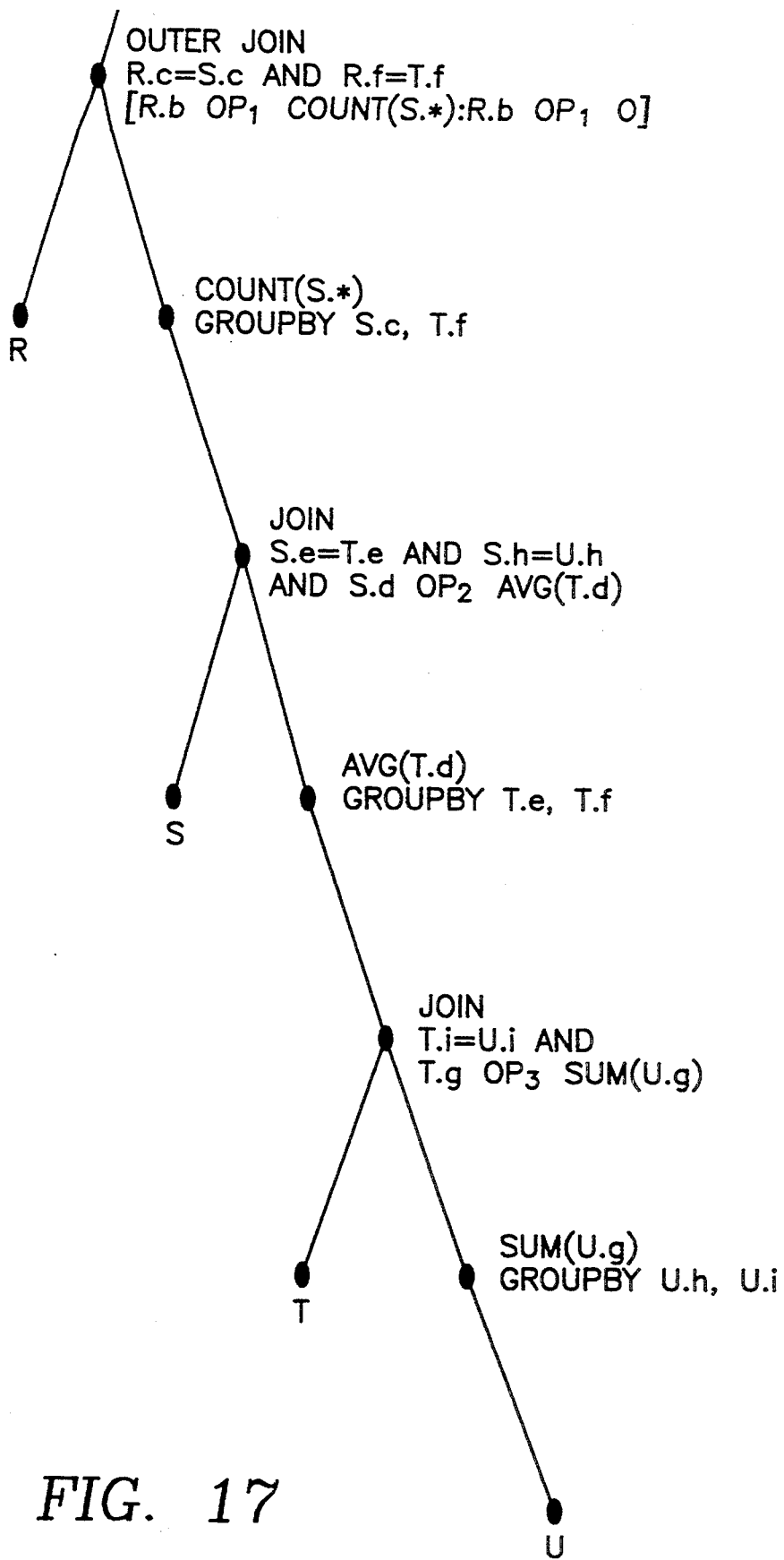
FIGS. 17 to 22 are six alternative query graphs obtained by un-nesting the query graph shown in FIG. 14 in accordance with the procedure of FIGS. 15 and 16.

In FIG. 17, Kim's method and the method of FIG. 12 are applied to blocks 2, 3 and 4.

Figure 18:
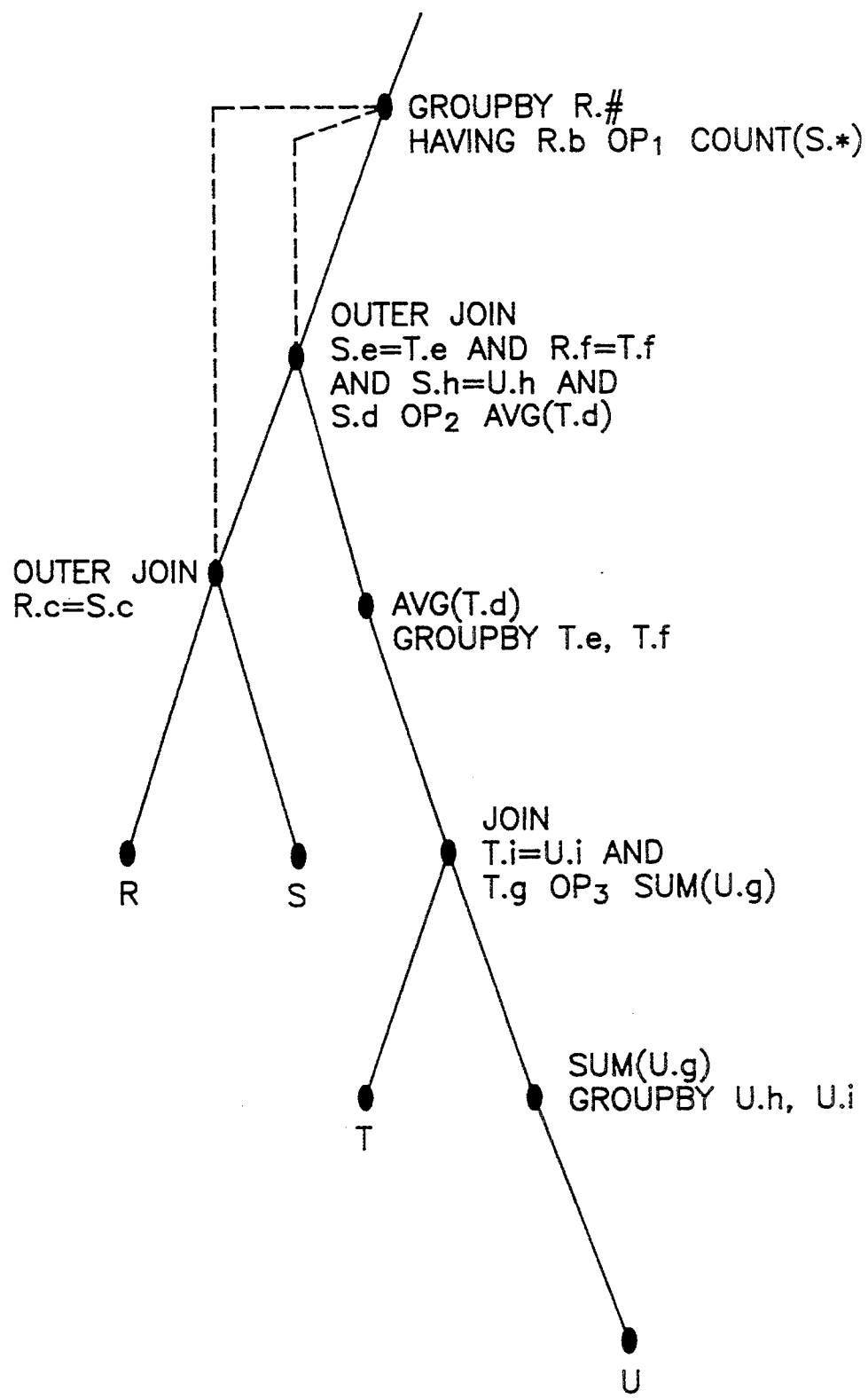

In FIG. 18, R and S are joined by Ganski's method, and Kim's method is applied to blocks 3 and 4. Since the outer join between R and S is performed before the join, the first join is now evaluated as an outer join.

Figure 19:
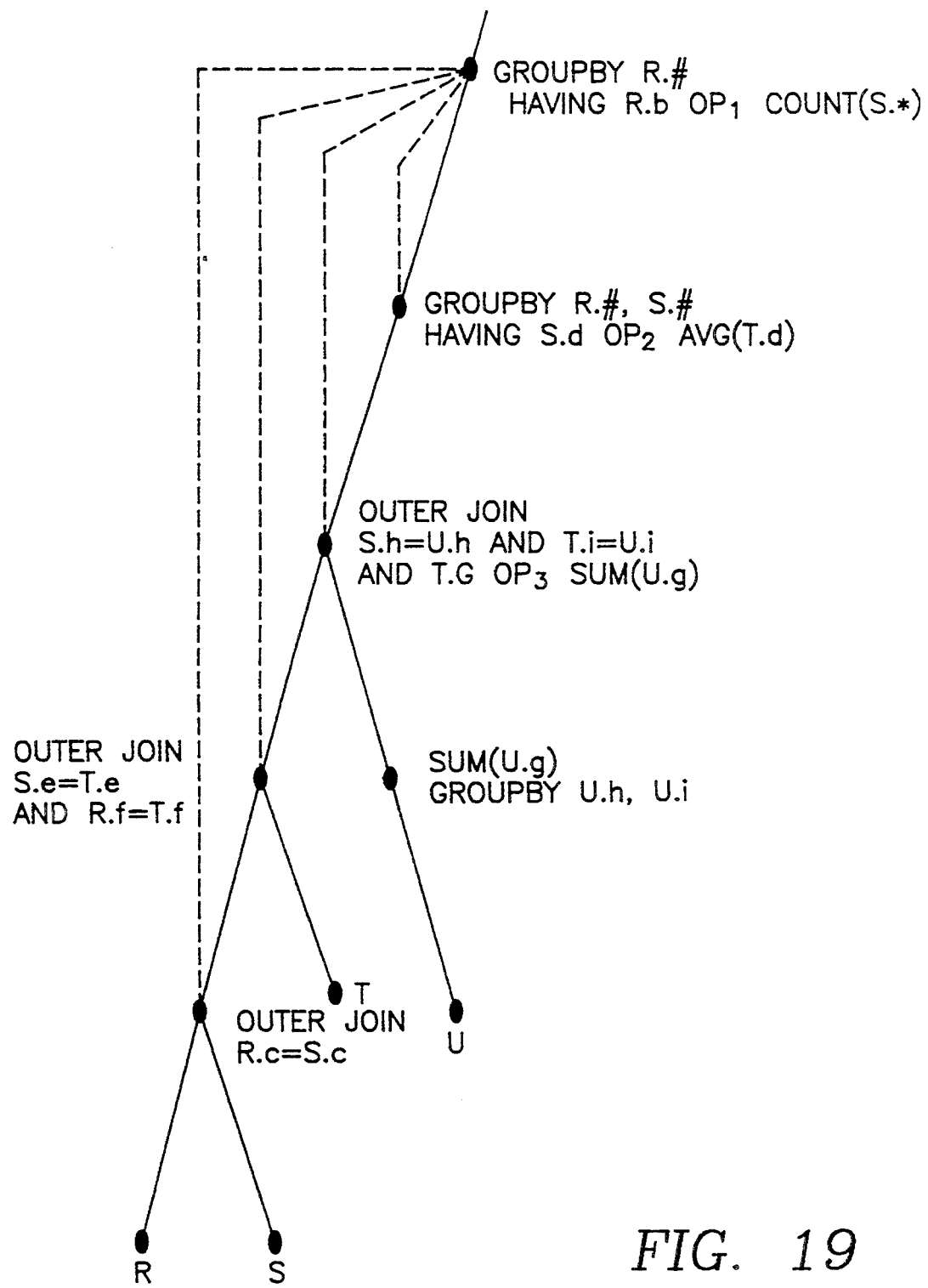

In FIG. 19, R, S and T are joined by Ganski's method, and Kim's method is applied to block 4. Notice that both joins are now replaced by outer joins.

Figure 20:
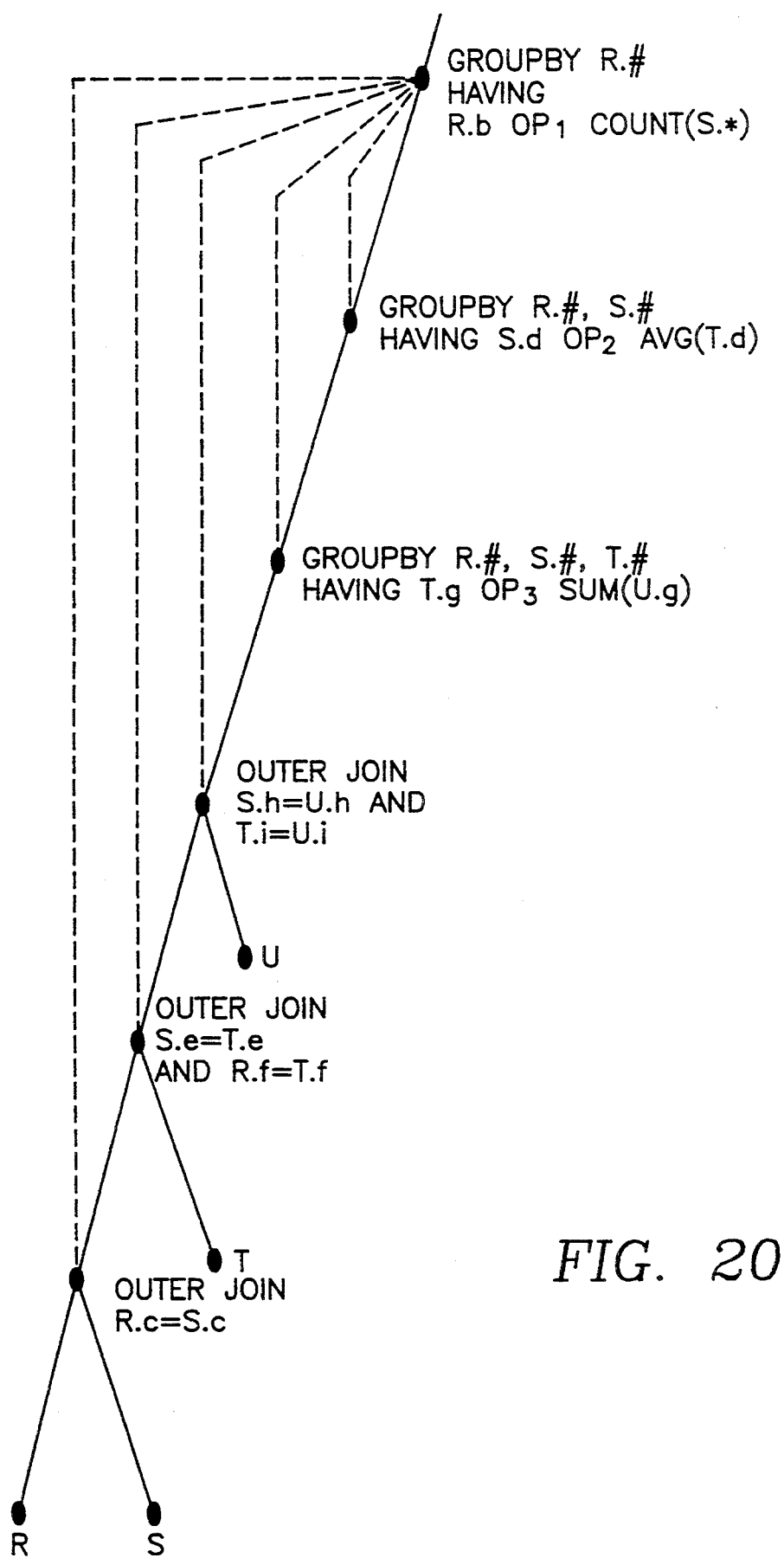

In FIG. 20, Ganski's method is used to replace all joins by outer joins, followed by three groupby operations.

Figure 21:
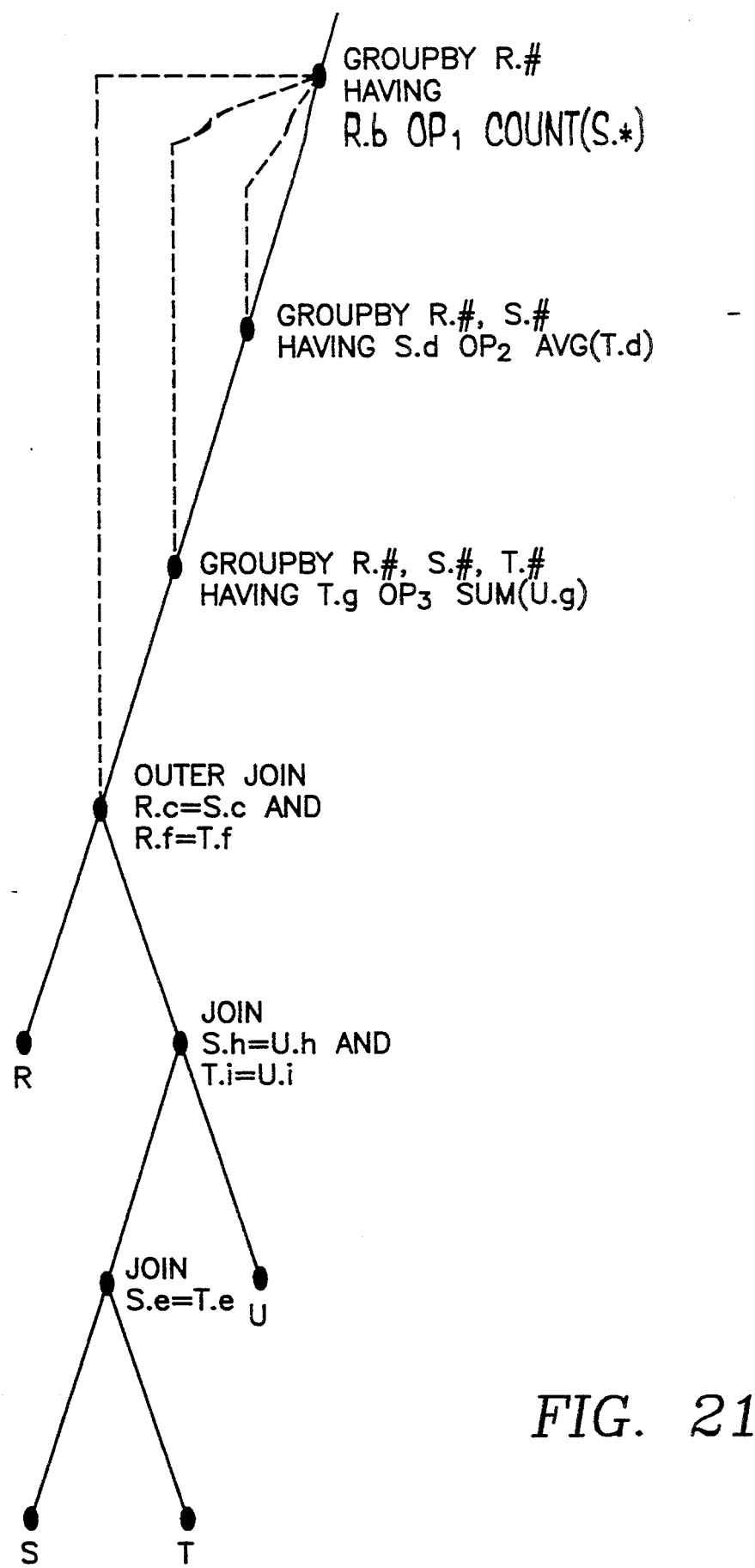

In FIG. 21, Kim's method is used to join relations S, T and U first, followed by outer joins from Ganski's method.

Figure 22:
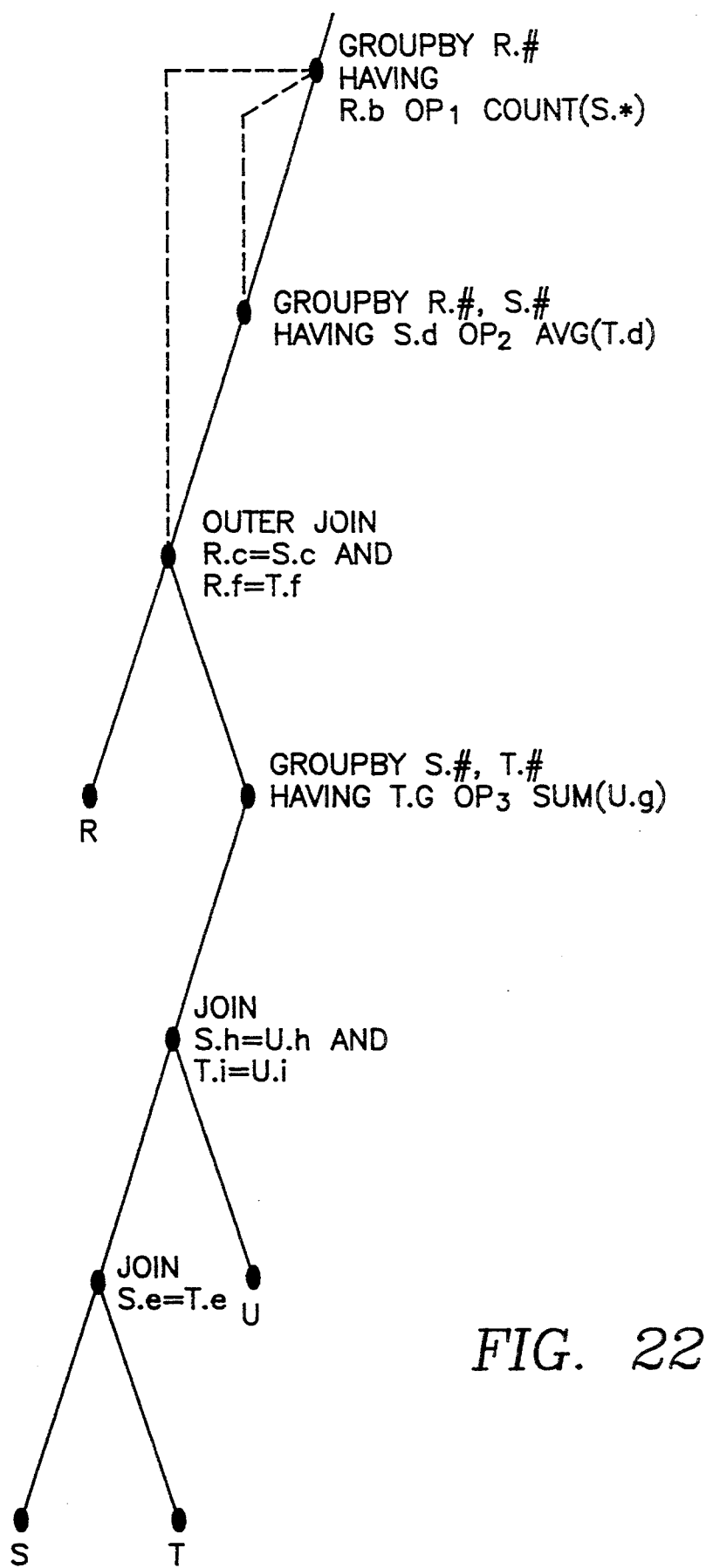

In FIG. 22, Kim's method is used to join relations S, T and U first. Since the bottom-most aggregate depends only on relations S and T, the bottom-most aggregate is computed before the outer join with R.

Notice that it was important to evaluate the joins incrementally. Most of the outer join nodes in FIGS. 17 to 22 have two output edges. The vertical edge represents the anti-join tuples, while the other edge represents the join tuples. Similarly, the groupby-having nodes have two output edges. The vertical edge represents the groups that did not satisfy that condition in the having clause. These groups have certain portions nulled out. For example, in FIG. 20, groups flowing from the first groupby-having node to the topmost groupby-having node along the vertical edge are of the form (R, NULL). Also, FIGS. 18 to 22 have edges that route tuples to a node much higher in the tree than the immediate parent. As pointed out in *Murali*, supra, this is optional but leads to savings in message costs.

In view of the above, there has been described a relational database system including a query optimizer that has available to it an alternative method for un-nesting queries that include a COUNT aggregate. In many cases the alternative method provides a more efficient way of executing the un-nested queries. In other cases the alternative method permits alternative query plans to be generated which may result in a savings in the total cost of the query.

What is claimed is:

1. A method of operating a digital computer for un-nesting an inner query from an outer query, said inner query referencing a first relation also referenced in said outer query, said inner query including a first predicate joining said first relation to a second relation, said inner query also including a count aggregate, said outer query having a second predicate referencing said first relation and said inner query, said method comprising the steps of:
   a) converting said inner query to a first un-nested query by removing said first predicate and modifying said count aggregate function to count over groups of distinct values of said second relation; and
   b) converting said outer query to a second un-nested query receiving results of said inner query by modifying said second predicate so that said second predicate is applied to said first relation and said results for values of said first relation which are joined to said results by said first predicate and so that said second predicate is applied to said first relation and a value of zero for values of said first relation which are not joined to any of said results by said first predicate.

2. The method as claimed in claim 1, wherein said inner query and said outer query are expressed in a query language including alphanumeric names for said first and second relations and alphanumeric symbols for operators in said first and second predicates.

3. The method as claimed in claim 2, wherein said inner query includes a select statement including the words "SELECT" and "COUNT" and said first predicate is included in a where statement including the word "WHERE".

4. The method as claimed in claim 2, further comprising the step of parsing said inner and outer query to form a linked data structure including a first node representing said inner query and a second node representing said outer query.

5. The method as claimed in claim 4, wherein said steps of converting generate another linked data structure including a third node defining said first un-nested query and a fourth node defining said second un-nested query.

6. The method as claimed in claim 5, wherein said another linked data structure includes a series of nodes defining a sequence of join and outer-join operations including a consecutive series of m joins, and wherein the first i joins are evaluated at a time first for i=1, then for i=2, then for i=3, . . . , and finally for i=m.

7. The method as claimed in claim 6, wherein said evaluating generates a respective linked data structure for each value of i representing an alternative query plan.

8. The method as claimed in claim 4, wherein said linked data structure is hierarchical and includes a multiplicity of nodes descendant from a root node, and said steps of converting are performed upon parent-child pairs of nodes when the child nodes are leaf nodes in said linked data structure.

9. The method as claimed in claim 1, further comprising the step of executing said second un-nested query by indexing said results of said first un-nested query with a first index and indexing values of said first relation with a second index, and for each value of said first relation that is indexed by said second index, sequencing said first index and iteratively testing said first predicate with said each value of said first relation and one of said results indexed by said first index, and when said testing finds that said first predicate is true, testing said second predicate with said each value of said first relation and the indexed one of said results and terminating said testing of said first predicate with said each value of said first relation, and when said testing has tested said first predicate for said each value of said first relation and all of said results without ever finding that said first predicate is true, applying said second predicate to said each value of said first relation and a value of zero.

10. A method of operating a digital computer for executing an outer query including a nested inner query, said inner query referencing a first relation also referenced in said outer query, said inner query including a first predicate joining said first relation to a second relation, said inner query also including a count aggregate, said outer query having a second predicate referencing said first relation and said inner query, said method comprising the steps of:
   a) computing a third relation including values of said second relation by counting over groups of distinct values of said second relation to compute a count for each distinct value of said second relation; and
   b) applying said first predicate to combinations of values of said first relation and the distinct values of said second relation, and for combinations of values of said first relation and distinct values of said second relation which satisfy said first predicate, applying said second predicate to said first relation and the count of said third relation for each distinct value of said second relation, and for values of said first relation for which said first predicate is not satisfied in combination with any of said distinct values of said second relation, applying said second predicate to said first relation and a value of zero.

11. The method as claimed in claim 10, wherein said inner query and said outer query are expressed in a query language including alphanumeric names for said first and second relations and alphanumeric symbols for operators in said first and second predicates.

12. The method as claimed in claim 11, wherein said inner query includes a select statement including the words "SELECT" and "COUNT", and said first predicate is included in a where statement including the word "WHERE".

13. The method as claimed in claim 11, further comprising the step of parsing said inner and outer query to form a linked data structure including a first node representing said inner query and a second node representing said outer query.

14. The method as claimed in claim 13, further comprising the step of converting said linked data structure into another linked data structure including a third node defining a first un-nested query for generating said third relation and a fourth node defining a second un-nested query for receiving said third relation, and wherein said step (a) of computing is performed by executing said first un-nested query and said step (b) of applying is performed by executing said second un-nested query.

15. The method as claimed in claim 14, wherein said another linked data structure includes a series of nodes defining a sequence of join and outer-join operations including a consecutive series of m joins, and wherein the first i joins are evaluated at a time first for i=1, then for i=2, then for i=3, . . . , and finally for i=m.

16. The method as claimed in claim 14, wherein said linked data structure formed by said parsing is hierarchical and includes a multiplicity of nodes descendant from a root node, and said step of converting is performed upon parent-child pairs of nodes when the child nodes are leaf nodes in said linked data structure formed by said parsing.

17. The method as claimed in claim 10, wherein said step (b) of applying includes indexing said third relation with a first index and indexing all values of said first relation with a second index, and for each value of said first relation, sequencing said first index and iteratively testing said first predicate with said each value of said first relation and one of said values of said second relation indexed by said first index, and when said testing finds that said first predicate is true, testing said second predicate with said each value of said first relation and the count for the indexed one of said values of said second relation and terminating said testing of said first predicate with said each value of said first relation, and when said testing has tested said first predicate for said each value of said first relation and all of said values of said second relation from said third relation without ever finding that said first predicate is true, applying said second predicate to said each value of said first relation and a value of zero.

18. A database system comprising, in combination:
a memory having stored in it a relational database;
an input device for receiving a query from a user requesting data from said relational database;
an output device for transmitting to the user data from said relational database; and
a query processing system including means for parsing said query to generate a query graph in said memory representing said query, means for generating an optimized query from said query graph; and means for executing said optimized query;
wherein said means for generating an optimized query includes means for un-nesting an inner query from an outer query, said inner query referencing a first relation also referenced in said outer query, said inner query including a first predicate joining said first relation to a second relation, said inner query also including a count aggregate, said outer query having a second predicate referencing said first relation and said inner query, said means for generating including:
a) means for converting said inner query to a first un-nested query by removing said first predicate and modifying said count aggregate function to count over groups of distinct values of said second relation; and
b) means for converting said outer query to a second un-nested query receiving results of said inner query by modifying said second predicate so that said second predicate is applied to said first relation and said results for values of said first relation which are joined to said results by said first predicate and so that said second predicate is applied to said first relation and a value of zero for values of said first relation which are not joined to any of said results by said first predicate.

19. The relational database system as claimed in claim 18, wherein said means for executing said optimized query includes means for executing said second un-nested query by indexing said results of said first un-nested query with a first index and indexing all values of said first relation with a second index, and for each value of said first relation that is indexed by said second index, sequencing said first index and iteratively testing said first predicate with said each value of said first relation and one of said results indexed by said first index, and when said testing finds that said first predicate is true, testing said second predicate with said each value of said first relation and the indexed one of said results and terminating said testing of said first predicate with said each value of said first relation, and when said testing has tested said first predicate for said each value of said first relation and all of said results without ever finding that said first predicate is true, applying said second predicate to said each value of said first relation and a value of zero.

20. The method as claimed in claim 18, wherein said means for parsing includes means for parsing a series of a multiplicity of nested queries to generate a query graph including a multiplicity of linked nodes, said means for un-nesting includes means for generating another query graph including a series of a multiplicity of linked nodes representing un-nested queries each having either a join or an outer-join operation and together defining a sequence of join and outer-join operations including a consecutive series of m joins, and wherein said means for optimizing further includes means for generating a plurality of alternative query graphs by evaluating the first i joins at a time first for i=1, then for i=2, then for i=3, . . . , and finally for i=m.

* * * * *